United States Patent
Kasslin et al.

(10) Patent No.: US 9,693,217 B2
(45) Date of Patent: Jun. 27, 2017

(54) METHOD, APPARATUS, AND COMPUTER PROGRAM PRODUCT FOR SERVICE DISCOVERY PROXY FOR WIRELESS COMMUNICATION

(71) Applicant: Nokia Technologies Oy, Espoo (FI)

(72) Inventors: Mika Kasslin, Espoo (FI); Olli Alanen, Vantaa (FI); Janne Marin, Espoo (FI); Jarkko Kneckt, Espoo (FI)

(73) Assignee: Nokia Technologies Oy, Espoo (FI)

( * ) Notice: Subject to any disclaimer, the term of this patent is extended or adjusted under 35 U.S.C. 154(b) by 2 days.

(21) Appl. No.: 14/721,317

(22) Filed: May 26, 2015

(65) Prior Publication Data
US 2016/0353269 A1    Dec. 1, 2016

(51) Int. Cl.
| | |
|---|---|
| H04W 4/00 | (2009.01) |
| H04W 8/00 | (2009.01) |
| H04L 29/08 | (2006.01) |
| H04W 48/16 | (2009.01) |
| H04W 88/18 | (2009.01) |

(52) U.S. Cl.
CPC ............ *H04W 8/005* (2013.01); *H04L 67/16* (2013.01); *H04L 67/303* (2013.01); *H04W 48/16* (2013.01); *H04W 88/182* (2013.01)

(58) Field of Classification Search
CPC ............... H04W 76/023; H04W 48/18; H04W 72/0426; H04W 48/16; H04W 8/005; H04L 67/16; H04L 67/303
USPC ......................................................... 370/329
See application file for complete search history.

(56) References Cited

U.S. PATENT DOCUMENTS

| | | |
|---|---|---|
| 5,844,900 A | 12/1998 | Hong et al. |
| 6,292,508 B1 | 9/2001 | Hong et al. |
| 6,466,608 B1 | 10/2002 | Hong et al. |
| 6,842,460 B1 | 1/2005 | Olkkonen et al. |
| 7,809,835 B2 | 10/2010 | Reunamaki et al. |
| 8,571,519 B2 | 10/2013 | Ginzboorg |
| 8,879,992 B2 | 11/2014 | Kneckt et al. |
| 2002/0044549 A1 | 4/2002 | Johansson et al. |
| 2004/0221046 A1 | 11/2004 | Heinonen et al. |
| 2007/0086424 A1 | 4/2007 | Calcev et al. |
| 2008/0253327 A1 | 10/2008 | Kohvakka et al. |
| 2009/0215457 A1 | 8/2009 | Wang et al. |

(Continued)

FOREIGN PATENT DOCUMENTS

WO    WO2015038272    3/2015

OTHER PUBLICATIONS

Wi-Fi Alliance: "Neighbor Awareness Networking Technical Specification", May 1, 2015, XP055258740, Retrieved from Internet: URL:https://www.wi-fi.org/download.php?file=/sites/default/files/private/Neighbor_Awareness_Networking_Technical_Specification_v1_0_0.pdf [retrieved on Mar. 16, 2016].

(Continued)

*Primary Examiner* — Sai-Ming Chan
(74) *Attorney, Agent, or Firm* — Locke Lord LLP

(57) ABSTRACT

A method comprises composing, by a wireless device in a wireless network, a service ID indicating support for providing proxy service discovery for other wireless devices operating in the wireless network; and transmitting, by the wireless device, a wireless service discovery frame to the wireless network, the service discovery frame including the composed service ID.

24 Claims, 18 Drawing Sheets

(56) References Cited

U.S. PATENT DOCUMENTS

| | | |
|---|---|---|
| 2009/0240794 A1* | 9/2009 | Liu .................. H04L 29/08846 |
| | | 709/223 |
| 2009/0313310 A1 | 12/2009 | Thome et al. |
| 2010/0113042 A1 | 5/2010 | Kasslin et al. |
| 2010/0165875 A1 | 7/2010 | Kneckt et al. |
| 2010/0226297 A1 | 9/2010 | Kasslin et al. |
| 2010/0304759 A1 | 12/2010 | Leppanen et al. |
| 2010/0322213 A1 | 12/2010 | Liu et al. |
| 2011/0223937 A1 | 9/2011 | Leppanen et al. |
| 2012/0176941 A1 | 7/2012 | Bata et al. |
| 2013/0072248 A1 | 3/2013 | Bajko |
| 2014/0269555 A1 | 9/2014 | Sadasivam et al. |
| 2016/0127996 A1 | 5/2016 | Patil et al. |
| 2016/0270137 A1* | 9/2016 | Yong .................. H04W 76/023 |
| 2016/0323925 A1* | 11/2016 | Alanen ................ H04W 8/005 |

OTHER PUBLICATIONS

International Search Report and Written Opinion mailed Aug. 16, 2016 in International Application No. PCT/US2016/033467.

* cited by examiner

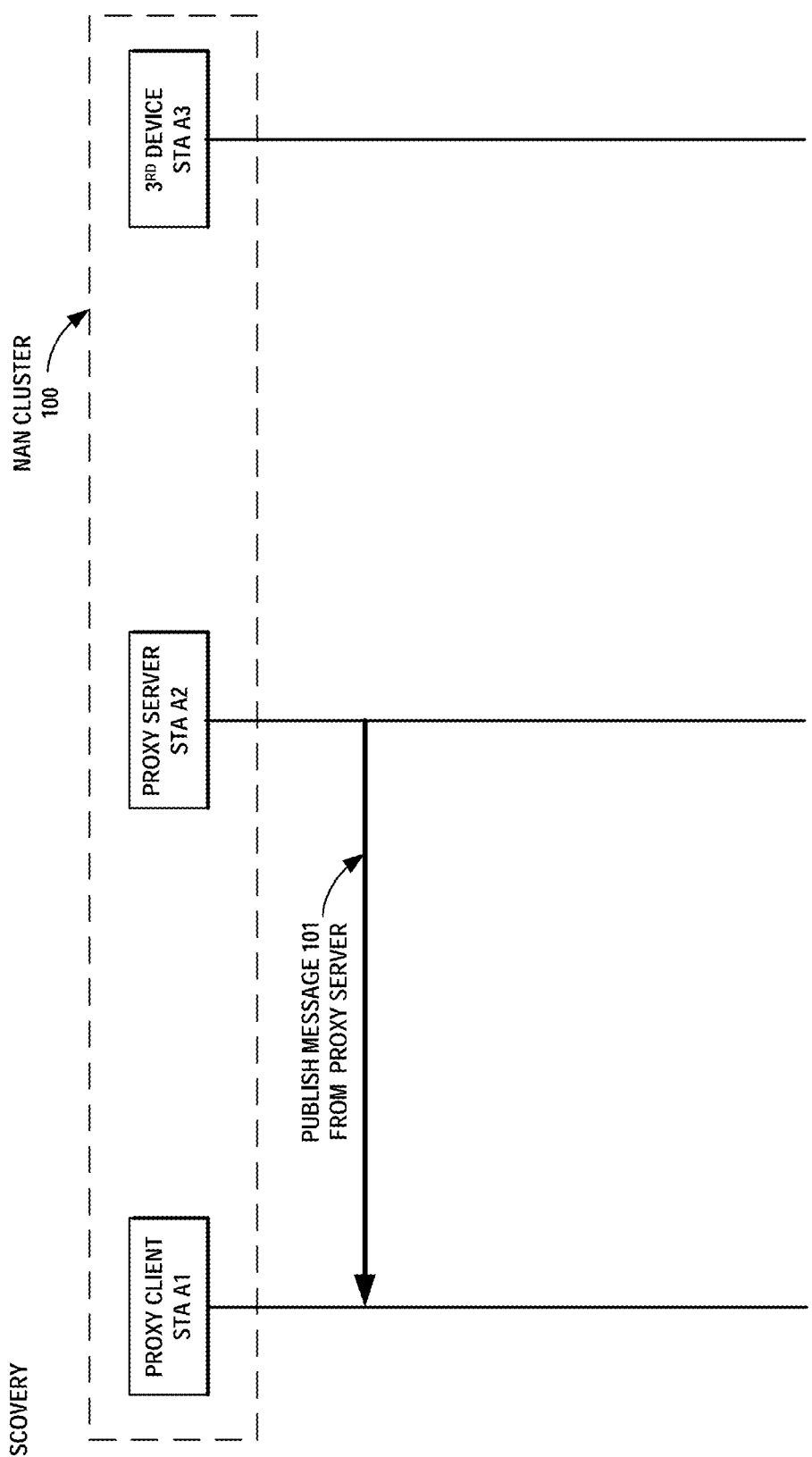

PROXY SERVER DISCOVERY

PUBLISH MESSAGE 101 FROM PROXY SERVER

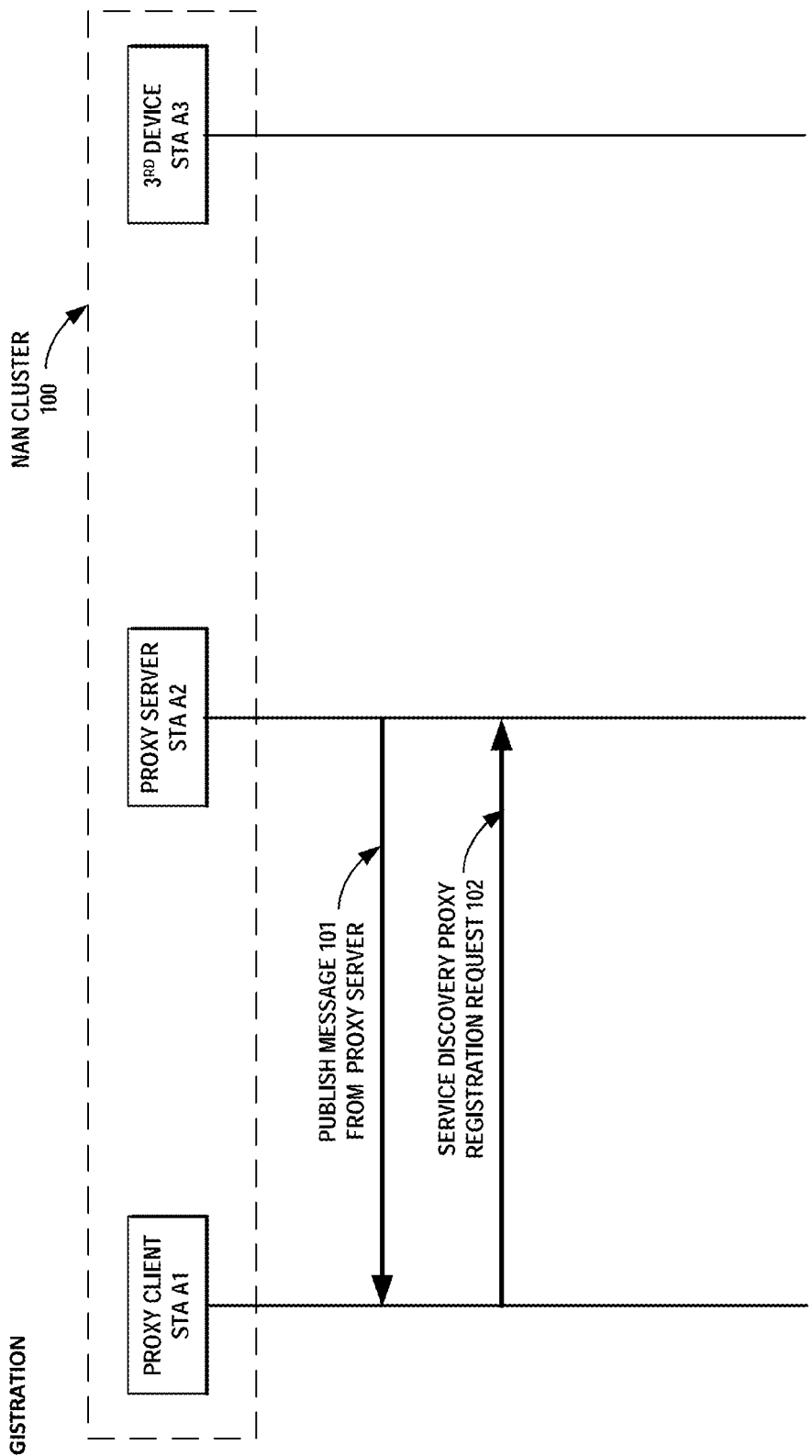

PROXY SESSION REGISTRATION

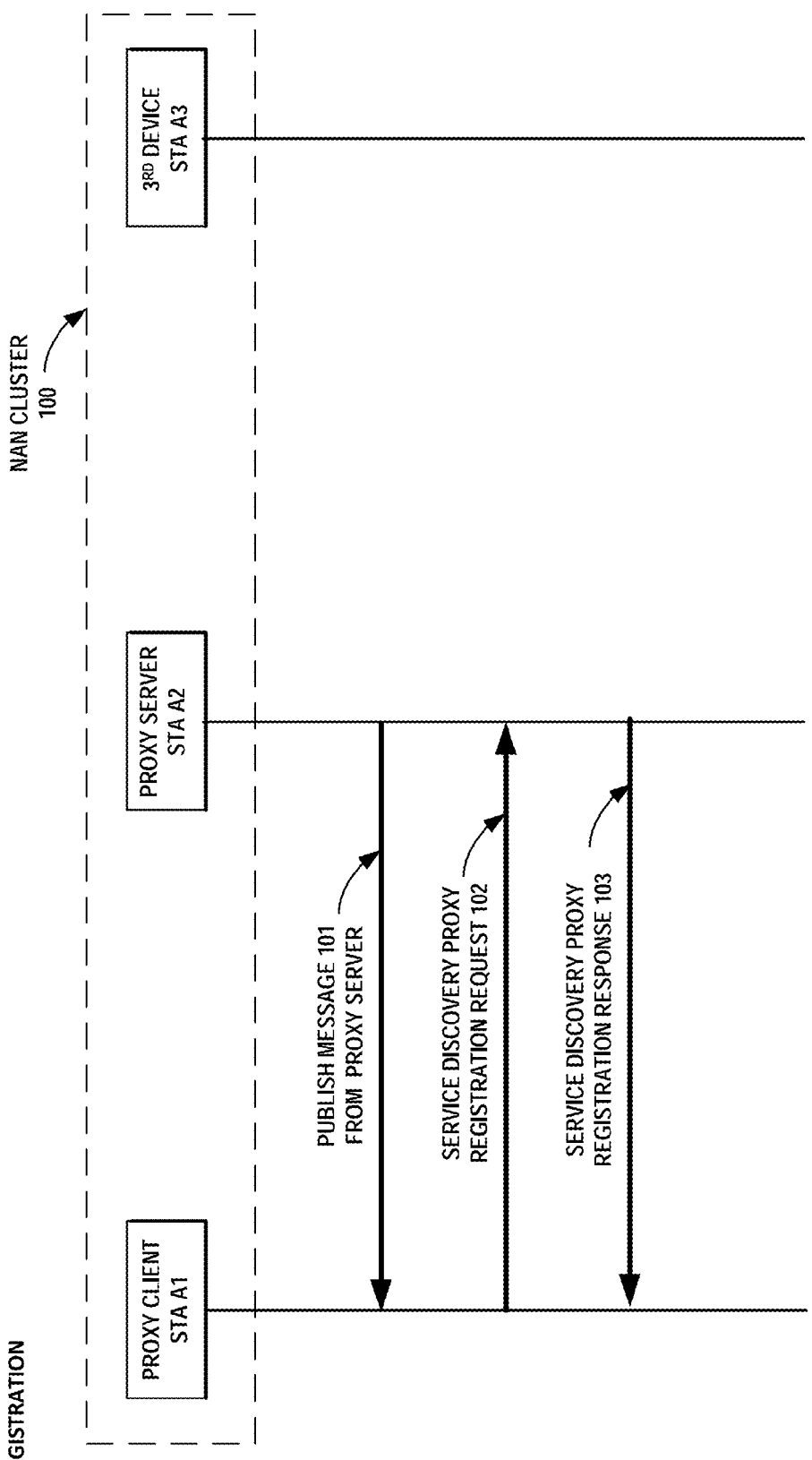

PROXY SESSION REGISTRATION

FIG. 4A
SERVICE CONTROL FIELD

FIG. 4B
SERVICE DESCRIPTOR

FIG. 5
NAN SERVICE DISCOVERY PROXY ATTRIBUTE

| Field | Size (octets) | Value | Description |
|---|---|---|---|
| Attribute ID | 1 | 0x0E | Identifies the type of NAN attribute. |
| Length | 2 | Variable | Length of the following fields in the attribute. |
| Proxy client address | 6 | Variable | NAN interface address of the proxy client |
| Proxy client availability | 2 | Variable | Number of NAN DWs before the NAN DW during which the proxy client is available. |

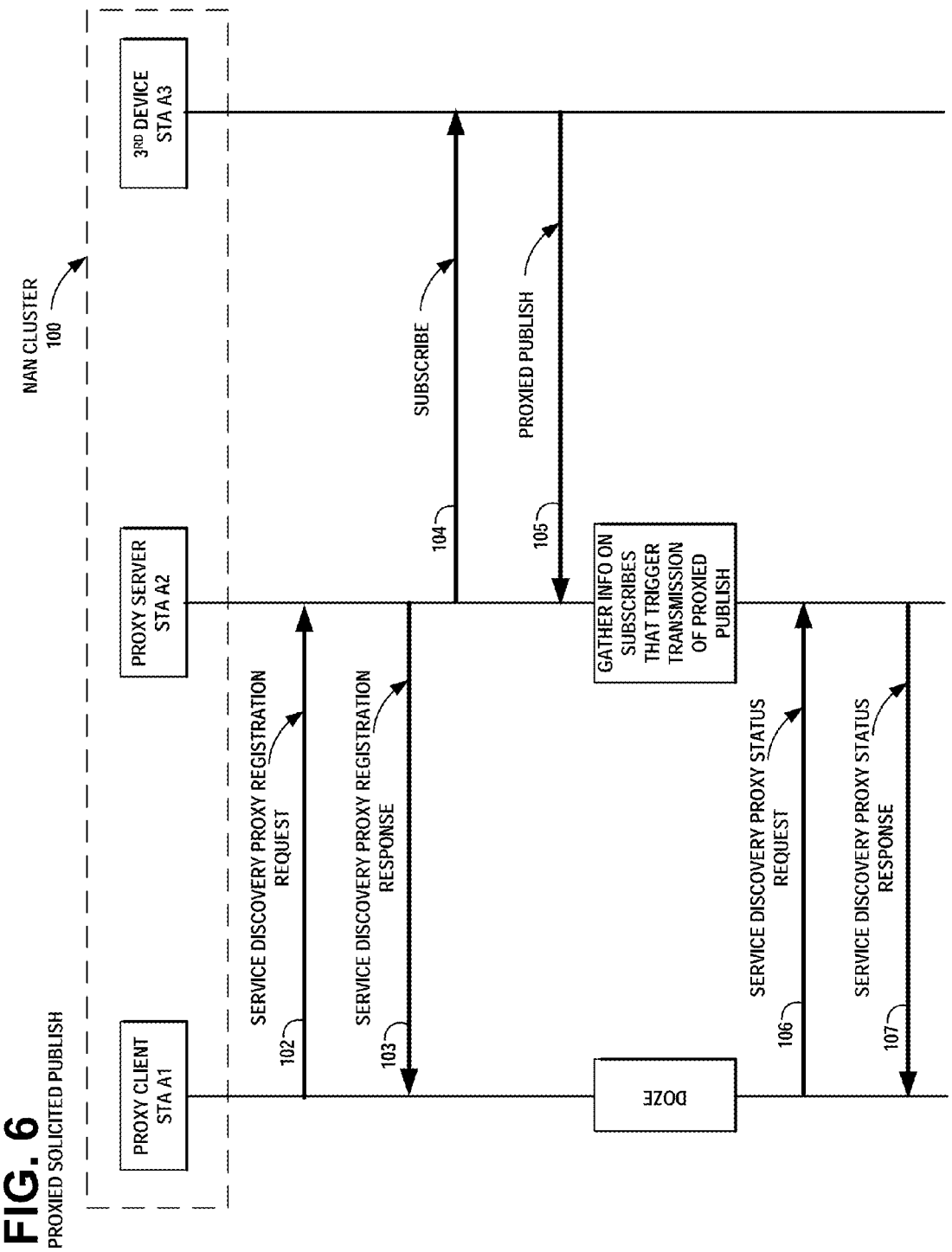

PROXIED UNSOLICITED PUBLISH

PROXIED PASSIVE SUBSCRIBE

FIG. 11A
PROXY SERVER

600

Step 602: composing, by a wireless device in a wireless network, a service ID indicating support for providing proxy service discovery for other wireless devices operating in the wireless network; and Step 604: transmitting, by the wireless device, a wireless service discovery frame to the wireless network, the service discovery frame including the composed service ID.

FIG. 11B
PROXY CLIENT

650 →

Step 652: receiving, by a wireless device in a wireless network, a wireless service discovery frame from another wireless device operating in the wireless network, the service discovery frame including a service ID indicating support by the other wireless device for providing proxy service discovery for wireless devices operating in the wireless network;

Step 654: transmitting, by the wireless device, to the other wireless device, a proxy registration request message in response to the wireless service discovery frame; and Step 656: receiving, by the wireless device, a response message in response to the proxy registration request message, indicating registration of the wireless device by the other wireless device, to provide a proxy service for the wireless device.

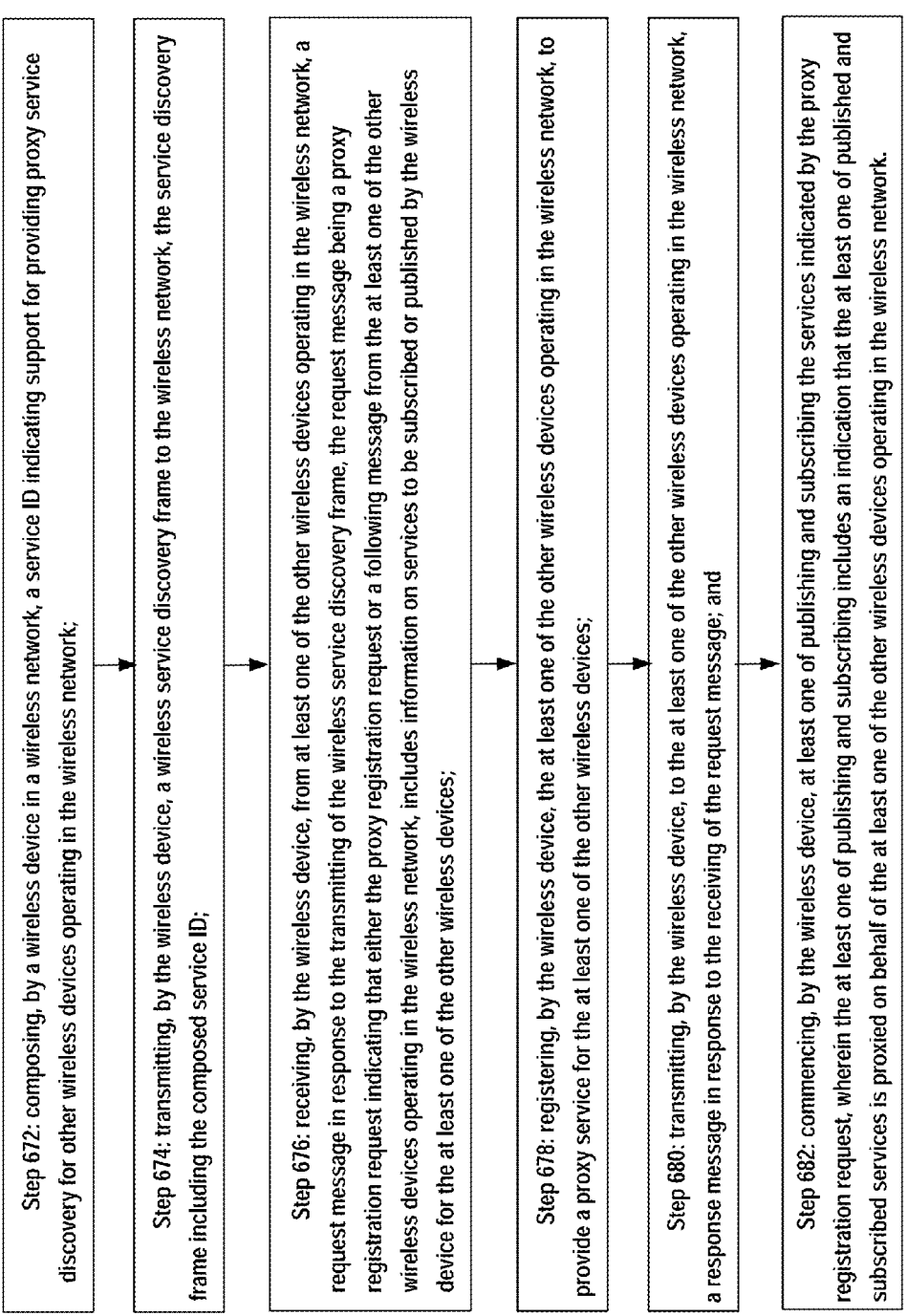

METHOD, APPARATUS, AND COMPUTER PROGRAM PRODUCT FOR SERVICE DISCOVERY PROXY FOR WIRELESS COMMUNICATION

FIELD

The field of the invention relates to wireless short-range communication and more particularly to a service discovery proxy scheme for wireless environment.

BACKGROUND

Modern society has adopted, and is becoming reliant upon, wireless communication devices for various purposes, such as, connecting users of the wireless communication devices with other users. Wireless communication devices can vary from battery powered handheld devices to household and/or commercial devices utilizing electrical network as a power source. Due to rapid development of the wireless communication devices a number of areas capable of enabling entirely new types of communication applications have emerged.

Cellular networks facilitate communication over large geographic areas. These network technologies have commonly been divided by generations, starting in the late 1970s to early 1980s with first generation (1G) analog cellular telephones that provided baseline voice communications, to modern digital cellular telephones. GSM is an example of a widely employed 2G digital cellular network communicating in the 900 MHZ/1.8 GHZ bands in Europe and at 850 MHz and 1.9 GHZ in the United States. While long-range communication networks, such as GSM, are a well-accepted means for transmitting and receiving data, due to cost, traffic and legislative concerns, these networks may not be appropriate for all data applications.

Short-range communication technologies provide communication solutions that avoid some of the problems seen in large cellular networks. Bluetooth™ is an example of a short-range wireless technology quickly gaining acceptance in the marketplace. In addition to Bluetooth™ other popular short-range communication technologies include Bluetooth™ Low Energy, IEEE 802.11 wireless local area network (WLAN), Wireless USB (WUSB), Ultra Wideband (UWB), ZigBee (IEEE 802.15.4, IEEE 802.15.4a), and ultra-high frequency radio frequency identification (UHF RFID) technologies. All of these wireless communication technologies have features that make them appropriate for various applications.

Applications for short-range wireless devices are evolving to include awareness applications providing the device with an awareness about the local network environment. Awareness applications have the promise of extending business and social networking by enabling users to share local contextual data in a peer-to-peer fashion by using their mobile wireless devices. For example, users may be able to share information in real-time for local-area business networking, social networking, dating, personal safety, advertising, publishing, and searching.

SUMMARY

Method, apparatus, and computer program product example embodiments enable a service discovery proxy scheme for wireless environment.

According to an example embodiment of the invention, a method comprises:

composing, by a wireless device in a wireless network, a service ID indicating support for providing proxy service discovery for other wireless devices operating in the wireless network; and transmitting, by the wireless device, a wireless service discovery frame to the wireless network, the service discovery frame including the composed service ID.

According to an example embodiment of the invention, a method comprises:

wherein the service discovery frame includes a publish message indicating availability of proxy service discovery that includes the composed service ID.

According to an example embodiment of the invention, a method comprises:

receiving, by the wireless device, from at least one of the other wireless devices operating in the wireless network, a proxy registration request message in response to the transmitting of the wireless service discovery frame;

registering, by the wireless device, the at least one of the other wireless devices operating in the wireless network, to provide a proxy publish service for the at least one of the other wireless devices; and transmitting, by the wireless device, to the at least one of the other wireless devices operating in the wireless network, a response message indicating initiation of proxy operation for the at least one of the other wireless devices, in response to the receiving of the proxy registration request message.

According to an example embodiment of the invention, a method comprises:

wherein the proxy registration request message is for indicating that either the proxy registration request or a following message from the at least one of the other wireless devices operating in the wireless network, includes information on services to be subscribed or published by the wireless device as a proxy for the at least one of the other wireless devices.

According to an example embodiment of the invention, a method comprises:

commencing, by the wireless device, at least one of publishing and subscribing the services indicated by the proxy registration request, wherein the at least one of publishing and subscribing includes an indication that the at least one of published and subscribed services is proxied on behalf of the at least one of the other wireless devices operating in the wireless network.

According to an example embodiment of the invention, a method comprises:

receiving, by a wireless device in a wireless network, a wireless service discovery frame from another wireless device operating in the wireless network, the service discovery frame including a service ID indicating support by the other wireless device for providing proxy service discovery for wireless devices operating in the wireless network;

transmitting, by the wireless device, to the other wireless device, a proxy registration request message in response to the wireless service discovery frame; and receiving, by the wireless device, a response message in response to the proxy registration request message, indicating registration of the wireless device by the other wireless device, to provide a proxy service for the wireless device.

According to an example embodiment of the invention, a method comprises:

wherein the service discovery frame includes a publish message indicating availability of proxy service discovery, which includes the service ID.

According to an example embodiment of the invention, a method comprises:

wherein the proxy registration request message is a proxy registration request indicating that either the proxy registration request or a following message sent by the wireless device, includes information on services to be subscribed or published by the other wireless device as a proxy on behalf of the wireless device.

According to an example embodiment of the invention, an apparatus comprises:

at least one processor;

at least one memory including computer program code;

the at least one memory and the computer program code configured to, with the at least one processor, cause the apparatus at least to:

compose in a wireless network, a service ID indicating support for providing proxy service discovery for other wireless devices operating in the wireless network; and transmit a wireless service discovery frame to the wireless network, the service discovery frame including the composed service ID.

According to an example embodiment of the invention, an apparatus comprises:

wherein the service discovery frame includes a publish message indicating availability of proxy service discovery that includes the composed service ID.

According to an example embodiment of the invention, an apparatus comprises:

the at least one memory and the computer program code configured to, with the at least one processor, cause the apparatus at least to:

receive from at least one of the other wireless devices operating in the wireless network, a proxy registration request message in response to the transmitting of the wireless service discovery frame;

register the at least one of the other wireless devices operating in the wireless network, to provide a proxy publish service for the at least one of the other wireless devices; and transmit to the at least one of the other wireless devices operating in the wireless network, a response message indicating initiation of proxy operation for the at least one of the other wireless devices, in response to the receiving of the proxy registration request message.

According to an example embodiment of the invention, an apparatus comprises:

wherein the proxy registration request message is for indicating that either the proxy registration request or a following message from the at least one of the other wireless devices operating in the wireless network, includes information on services to be subscribed or published by the wireless device as a proxy for the at least one of the other wireless devices.

According to an example embodiment of the invention, an apparatus comprises:

the at least one memory and the computer program code configured to, with the at least one processor, cause the apparatus at least to:

commence at least one of publishing and subscribing the services indicated by the proxy registration request, wherein the at least one of publishing and subscribing includes an indication that the at least one of published and subscribed services is proxied on behalf of the at least one of the other wireless devices operating in the wireless network.

According to an example embodiment of the invention, an apparatus comprises:

at least one processor;

at least one memory including computer program code;

the at least one memory and the computer program code configured to, with the at least one processor, cause the apparatus at least to:

receive in a wireless network, a wireless service discovery frame from another wireless device operating in the wireless network, the service discovery frame including a service ID indicating support by the other wireless device for providing proxy service discovery for wireless devices operating in the wireless network;

transmit to the other wireless device, a proxy registration request message in response to the wireless service discovery frame; and receive a response message in response to the proxy registration request message, indicating registration of the wireless device by the other wireless device, to provide a proxy service for the wireless device.

According to an example embodiment of the invention, an apparatus comprises:

wherein the service discovery frame includes a publish message indicating availability of proxy service discovery, which includes the service ID.

According to an example embodiment of the invention, an apparatus comprises:

wherein the proxy registration request message is a proxy registration request indicating that either the proxy registration request or a following message sent by the wireless device, includes information on services to be subscribed or published by the other wireless device as a proxy on behalf of the wireless device.

According to an example embodiment of the invention, a computer program product comprises computer executable program code recorded on a computer readable non-transitory storage medium, the computer executable program code comprising:

code for composing, by a wireless device in a wireless network, a service ID indicating support for providing proxy service discovery for other wireless devices operating in the wireless network; and code for transmitting, by the wireless device, a wireless service discovery frame to the wireless network, the service discovery frame including the composed service ID.

According to an example embodiment of the invention, a computer program product comprises:

wherein the service discovery frame includes a publish message indicating availability of proxy service discovery that includes the composed service ID.

According to an example embodiment of the invention, a computer program product comprises:

code for receiving, by the wireless device, from at least one of the other wireless devices operating in the wireless network, a proxy registration request message in response to the transmitting of the wireless service discovery frame;

code for registering, by the wireless device, the at least one of the other wireless devices operating in the wireless network, to provide a proxy publish service for the at least one of the other wireless devices; and code for transmitting, by the wireless device, to the at least one of the other wireless devices operating in the wireless network, a response message indicating initiation of proxy operation for the at least one of the other wireless devices, in response to the receiving of the proxy registration request message.

According to an example embodiment of the invention, a computer program product comprises:

wherein the proxy registration request message is for indicating that either the proxy registration request or a following message from the at least one of the other wireless devices operating in the wireless network, includes information on services to be subscribed or published by the wireless device as a proxy for the at least one of the other wireless devices.

According to an example embodiment of the invention, a computer program product comprises:

code for commencing, by the wireless device, at least one of publishing and subscribing the services indicated by the proxy registration request, wherein the at least one of publishing and subscribing includes an indication that the at least one of published and subscribed services is proxied on behalf of the at least one of the other wireless devices operating in the wireless network.

According to an example embodiment of the invention, a computer program product comprises computer executable program code recorded on a computer readable non-transitory storage medium, the computer executable program code comprising:

code for receiving, by a wireless device in a wireless network, a wireless service discovery frame from another wireless device operating in the wireless network, the service discovery frame including a service ID indicating support by the other wireless device for providing proxy service discovery for wireless devices operating in the wireless network;

code for transmitting, by the wireless device, to the other wireless device, a proxy registration request message in response to the wireless service discovery frame; and code for receiving, by the wireless device, a response message in response to the proxy registration request message, indicating registration of the wireless device by the other wireless device, to provide a proxy service for the wireless device.

According to an example embodiment of the invention, a computer program product comprises:

wherein the service discovery frame includes a publish message indicating availability of proxy service discovery, which includes the service ID.

According to an example embodiment of the invention, a computer program product comprises:

wherein the proxy registration request message is a proxy registration request indicating that either the proxy registration request or a following message sent by the wireless device, includes information on services to be subscribed or published by the other wireless device as a proxy on behalf of the wireless device.

DESCRIPTION OF THE FIGURES

FIG. 1 illustrates an example network diagram of a proxy server wireless device, a proxy client wireless device, and a third wireless device that are operating in a neighbor awareness network cluster. The proxy server has composed a service ID indicating support for providing proxy service discovery for other wireless devices operating in the neighbor awareness network. The proxy server is shown transmitting a wireless service discovery frame to the neighbor awareness network, the service discovery frame including the composed service ID, in accordance with at least one embodiment of the present invention.

FIG. 2 illustrates the example network diagram of FIG. 1, wherein the proxy client has received the wireless service discovery frame from the proxy server, including the service ID indicating support by the proxy server for providing proxy service discovery for wireless devices operating in the neighbor awareness network. The figure shows the proxy client transmitting to the proxy server, a service discovery proxy registration request, in response to the receiving of the wireless service discovery frame, in accordance with at least one embodiment of the present invention.

FIG. 3 illustrates the example network diagram of FIG. 1, wherein the proxy server has received the service discovery proxy registration request from the proxy client. The figure shows the proxy server transmitting to the proxy client, a service discovery proxy registration response, in response to the receiving of the service discovery proxy registration request, in accordance with at least one embodiment of the present invention.

FIG. 4A shows an example format of a modified service control field in the NAN service discovery message, with the proxied publish and subscribe implemented, in accordance with at least one embodiment of the present invention.

FIG. 4B shows an example format of proxy specific fields in the Service Info field of a Service Descriptor attribute in the NAN service discovery message, in accordance with at least one embodiment of the present invention.

FIG. 5 shows an example format of a new NAN Service Discovery Proxy attribute in the NAN service discovery message, in accordance with at least one embodiment of the present invention.

FIG. 6 shows an example signal sequence diagram for a proxied solicited publish, in accordance with at least one embodiment of the present invention.

FIG. 11A is an example flow diagram of operational steps in the proxy server, in accordance with at least one embodiment of the present invention.

FIG. 11B is an example flow diagram of operational steps in the proxy client, in accordance with at least one embodiment of the present invention.

FIG. 11C is an example flow diagram of operational steps in the proxy server commencing at least one of publishing and subscribing the services indicated by the proxy registration request, in accordance with at least one embodiment of the present invention.

DISCUSSION OF EXAMPLE EMBODIMENTS OF THE INVENTION

Figure 1A:
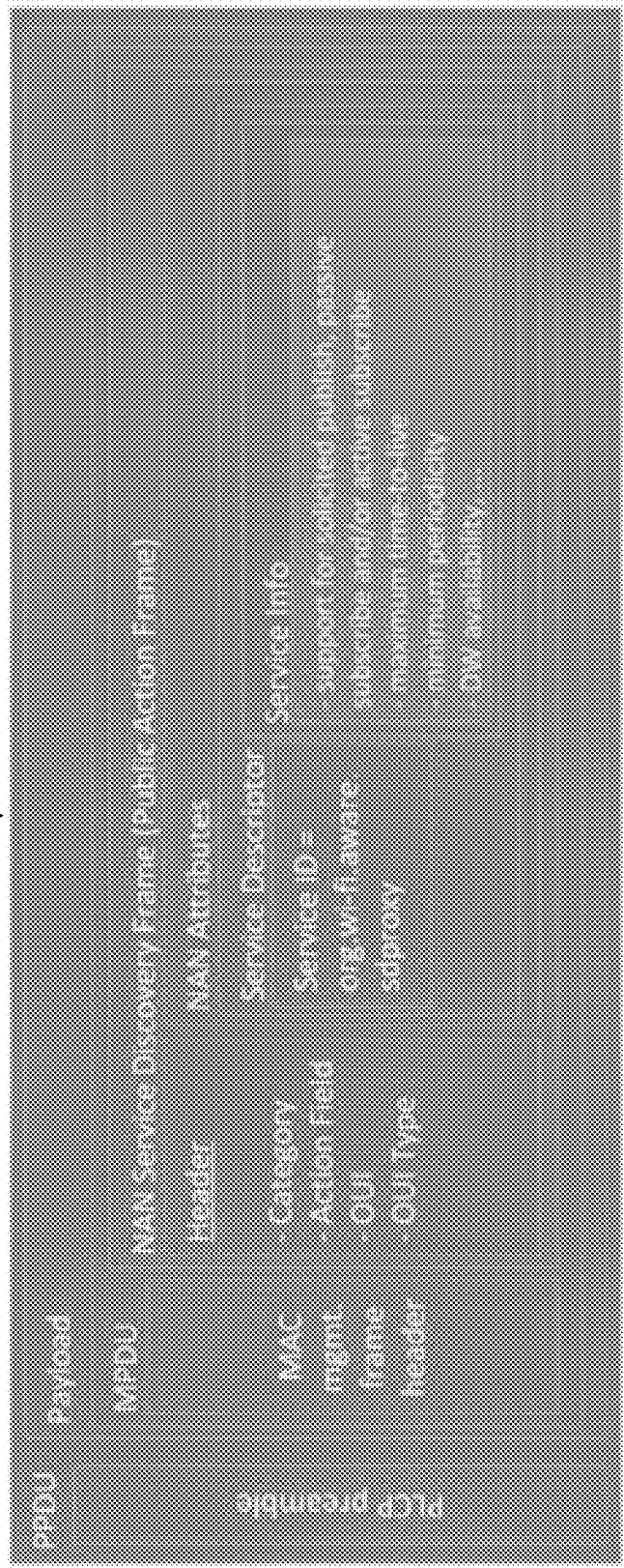
FIG. 1A shows an example format of the wireless service discovery frame, which is a publish message transmitted by the proxy server, in accordance with at least one embodiment of the present invention.

This section is organized into the following topics:
A. WLAN Communication Technology
B. Awareness Network Technology
C. Neighbor Awareness Networking (NAN)
D. Neighbor Awareness Networking Service Discovery Proxy A. WLAN Communication Technology The IEEE 802.11 standard specifies methods and techniques of an exemplary wireless local area network (WLAN) operation. Examples include the IEEE 802.11b and 802.11g wireless local area network specifications, which have been a staple technology for traditional WLAN applications in the 2.4 GHz ISM band. There are 14 channels designated in the 2.4 GHz range spaced 5 MHz apart. The various amendments to the IEEE 802.11 standard were consolidated for IEEE 802.11a, b, d, e, g, h, i, j, k, n, r, s, u, v, and z protocols, into the base standard IEEE 802.11-2012, Wireless Medium Access Control (MAC) and Physical Layer (PHY) Specifications, February 2012. Since then, emerging broadband applications have stimulated interest in developing very high-speed wireless networks for short range communication, for example, the planned IEEE 802.11 ac, and the planned IEEE 802.11ad WLAN specifications that are to provide a very high throughput in various frequency bands. Applications of these IEEE 802.11 standards include products such as consumer electronics, telephones, personal computers, and access points for both for home and office.

1. IEEE 802.11 MAC Frames and Information Elements

There are three major types of medium access control (MAC) frames in the IEEE 802.11 protocol: the management frame, the control frame, and the data frame. Management frames provide management services. Data frames carry payload data. Control frames assist in the delivery of data frames. Each of these types of MAC frame consists of a MAC header, a frame body, and a frame check sequence (FCS). The header contains control information used for defining the type of 802.11 MAC frame and providing information necessary to process the MAC frame. The frame body contains the data or information included in either management type or data type frames. The frame check sequence is a value representing a cyclic redundancy check (CRC) over all the fields of the MAC header and the frame body field.

Management frames are used to provide management services that may be specified by variable-length fields called information elements included in the MAC frame body. An information element includes three fields: its function is identified by an element ID field, its size is provided by a length field, and the information to deliver to the recipient is provided in a variable-length information field.

2. IEEE 802.11 Beacon, Probe Request and Response
   a. Beacon

The beacon frame is a management frame that is transmitted periodically to allow wireless devices to locate and identify a network. The beacon frame includes the fields: timestamp, beacon interval, and capability information. The timestamp contains the value of the device's synchronization timer at the time that the frame was transmitted. The capability information field is a 16-bit field that identifies the capabilities of the device. The information elements in a beacon frame are the service set identifier (SSID), the supported rates, one or more physical parameter sets, an optional contention-free parameter set, and an optional traffic indication map.

i. Infrastructure BSS Networks with an Access Point

In an Infrastructure BSS Networks with an Access Point, beacon frames are used for enabling wireless devices to establish and maintain orderly communications. The beacon frames are transmitted by the Access Points at regular intervals and include a frame header and a body with various information, including a Service Set Identifier (SSID) identifying the name of a specific WLAN and a beacon interval specifying the intended time interval between two beacon transmissions. One important purpose of the beacon frames is to inform the wireless devices about the presence of an Access Point in the area. The access point in an infrastructure basic service set (BSS) IEEE 802.11 WLAN network, may be a central hub that relays all communication between the mobile wireless devices (STAs) in an infrastructure BSS. If a STA in an infrastructure BSS wishes to communicate a frame of data to a second STA, the communication may take two hops. First, the originating STA may transfer the frame to the AP. Second, the AP may transfer the frame to the second STA. In an infrastructure BSS, the AP may transmit beacons or respond to probes received from STAs. After a possible authentication of a STA that may be conducted by the AP, an association may occur between the AP and a STA enabling data traffic to be exchanged with the AP. The Access Point in an Infrastructure BSS may bridge traffic out of the BSS onto a distribution network. STAs that are members of the BSS may exchange packets with the AP.

ii. Ad Hoc IBSS Networks

The first ad hoc wireless device to become active establishes an IBSS and starts sending beacons to inform the other wireless devices about the presence of an ad hoc network in the area. Other ad hoc wireless devices may join the network after receiving a beacon and accepting the IBSS parameters, such as the beacon interval, found in the beacon frame.

Each wireless device that joins the ad hoc network may send a beacon periodically if it doesn't hear a beacon from another device within a short random delay period after the beacon is supposed to be sent. If a wireless device doesn't hear a beacon within the random delay period, then the wireless device assumes that no other wireless devices are active in the ad hoc network and a beacon needs to be sent.

A beacon signal is periodically transmitted from the ad hoc network. The beacon frame is transmitted periodically and includes the address of the sending device.

b. Probe Request

The probe request frame is a management frame that is transmitted by a wireless device attempting to quickly locate a wireless LAN. It may be used to locate independent basic service sets (IBSSs), infrastructure basic service sets (BSSs) or mesh basic service sets (MBSSs) only or any of them. It may be used to locate a wireless LAN with a particular SSID or to locate any wireless LAN. The probe request frame may contain a service attribute request.

For active scans, the wireless device either broadcasts or unicasts a probe request on the channel it is scanning. It may set the SSID in the probe request to a wildcard SSID or to a specific SSID value. It may set the BSSID in the probe request a wildcard BSSID or to a specific BSSID value. With these options the wireless device can look for any SSID or BSSID, any representative of a specific SSID or a specific BSSID. The wireless device will add any received beacons or probe responses to a cached basic service set identifier (BSSID) scan list. For passive scans, the wireless device does not send a probe request, but instead, listens on a channel for a period of time and adds any received beacons or probe responses to its cached BSSID scan list. The wireless device may scan both infrastructure and ad hoc networks, regardless of the current setting of its network mode. The wireless device may use either the active or passive scanning methods, or a combination of both scanning methods. The wireless device performs the scan across all the frequency channels and bands that it supports. There are 14 channels designated in the 2.4 GHz range spaced 5 MHz apart.

i. Infrastructure BSS Networks with an Access Point

The wireless device may transmit a probe request and receive a probe response from the access point AP in the BSS. The probe request is transmitted by a wireless device to obtain information from another station or access point. For example, a wireless device may transmit a probe request to determine whether a certain access point is available. In the infrastructure BSS, only the AP responds to probe requests. The probe response sent back by the AP contains a timestamp, beacon interval, and capability information. It also includes the Service Set Identity (SSID) of the BSS, supported rates, and PHY parameters. The wireless device STA may learn that the access point AP will accept the STA's credentials.

The rules applied by the scanning wireless device (i.e. scanner) and the APs with active scanning are as follows:
1) Scanner (for each channel to be scanned):
  a. Transmit a probe request frame (or multiple of thereof) with the SSID and the BSSID fields set as per the scan command;
  b. Reset ProbeTimer to zero and start it upon the probe request transmission;
  c. If nothing is detected (any signal with high enough energy) on the channel before the ProbeTimer reaches MinChannelTime (a.k.a Min_Probe_Response_Time), then go to scan the next channel (if any), else when the ProbeTimer reaches MaxChannelTime (i.e., Max_Probe_Response_Time), process all received probe responses and go to scan the next channel (if any).
2) APs:
  a. An AP shall respond with a probe response only if:
    i. The Address 1 field in the probe request frame is the broadcast address or the specific MAC address of the AP; and
    ii. The SSID in the probe request is the wildcard SSID, the SSID in the probe request is the specific SSID of the AP, or the specific SSID of the AP is included in the SSID list element of the probe request, or the Address 3 field in the probe request is the wildcard BSSID or the BSSID of the AP.
  b. Some further conditions may be set as well for the generation of a probe response.

In general, the probe request transmitter specifies the conditions that wireless devices need to meet in order to respond to with a probe response. All wireless devices that fulfill the condition try to send a probe response frame. The active scanning mechanism defines the signaling.

ii. Ad Hoc IBSS Networks

The effect of receiving a probe request is to cause the wireless device to respond with a probe response if the conditions indicated in the probe request are met. When a wireless device arrives within the communication range of any member of an ad hoc network, its probe request frame inquiry signals are answered by a member of the ad hoc network detecting the inquiry. A device in an ad hoc network that broadcasted the latest beacon in the network responds to the probe request frame inquiry signals with a probe response containing the address of the responding device. The probe response frame also includes the timestamp, beacon interval, capability information, information elements of the SSID, supported rates, one or more physical parameter sets, the optional contention-free parameter set, and the optional ad hoc network parameter set.

Once a device has performed an inquiry that results in one or more ad hoc network descriptions, the device may choose to join one of the ad hoc networks. The joining process may be a purely local process that occurs entirely internal to the wireless device. There may be no indication to the outside world that a device has joined a particular ad hoc network. Joining an ad hoc network may require that all of the wireless device's MAC and physical parameters be synchronized with the desired ad hoc network. To do this, the device may update its timer with the value of the timer from the ad hoc network description, modified by adding the time elapsed since the description was acquired. This will synchronize the timer to the ad hoc network. The BSSID of the ad hoc network may be adopted, as well as the parameters in the capability information field. Once this process is complete, the wireless device has joined the ad hoc network and is ready to begin communicating with the devices in the ad hoc network.

c. Probe Response

The probe response sent back by a wireless device that met the conditions set by the received probe request contains a timestamp, beacon interval, and capability information. It also includes the Service Set Identity (SSID) of the BSS, supported rates, and PHY parameters.

According to an example embodiment, standard spacing intervals are defined in the IEEE 802.11 specification, which delay a station's access to the medium, between the end of the last symbol of the previous frame and the beginning of the first symbol of the next frame. The short interframe space (SIFS), the shortest of the interframe spaces, may allow acknowledgement (ACK) frames and clear to send (CTS) frames to have access to the medium before others. The longer duration distributed coordination function (DCF) interframe space (IFS) or DIFS interval may be used for transmitting data frames and management frames.

According to an example embodiment, after the channel has been released, IEEE 802.11 and before a probe response is transmitted, wireless devices normally employ a spectrum sensing capability during the SIFS interval or DIFS interval, to detect whether the channel is busy. A carrier sensing scheme may be used wherein a node wishing to transmit a probe response has to first listen to the channel for a predetermined amount of time to determine whether or not another node is transmitting on the channel within the wireless range. If the channel is sensed to be idle, then the node may be permitted to begin the transmission process. If the channel is sensed to be busy, then the node may delay its transmission of a probe response for a random period of time called the backoff interval. In the DCF protocol used in IEEE 802.11 networks, the stations, on sensing a channel idle for DIFS interval, may enter the backoff phase with a random value between 0 and CWmin. The backoff counter may be decremented from this selected value as long as the channel is sensed idle for a predetermined time interval. After every received frame one may however wait for a DIFS before sensing the channel status and resuming backoff counter update.

B. Awareness Network Technology

Applications for short-range wireless devices are evolving to include awareness applications providing the device with an awareness about the local network environment. A non-limiting example awareness network architecture is the Nokia AwareNet framework, a network of wireless mobile devices self-organizing to support various applications, ranging from social networking to service discovery. Awareness information may be shared by a short-range wireless device sending an anonymous flooding message that may include a query, over an ad hoc network. A neighboring short-range wireless device may reply to the flooding message over the ad hoc network with a response, such as a pointer to a discovered location-based service.

Awareness information may include any information and/or context about a local network environment as well as the users and communication devices within the local network environment. Wireless devices may continuously collect and exchange information with other devices in a local network environment. Awareness applications running on short-range wireless devices may create a network for sharing awareness information, locate and organize awareness information, form communities for sharing awareness information, manage power consumption for devices engaged in sharing awareness information, develop applications to take advantage of the awareness information, and maintain the privacy and anonymity of users sharing awareness information.

Awareness applications running on short-range wireless devices, build upon a scheme in which every device is responsible for participating in beaconing and all the other basic operations that keep the ad hoc network in operation. An ad hoc network may be designed to have one network identifier (NWID) that all of the devices in the network share. The NWID may be announced in the beacons transmitted by the devices. In the overall design, those devices that operate under same NWID are driven to use a common and shared schedule to allow for awareness information gathering among all the devices within range. The determination of which schedule is used by a device may be made by the network instance timer value, and this timer value is communicated in beacons in the timing synchronization function (TSF) value parameter. The devices may be required to operate by assuming the oldest TSF value (i.e. largest TSF value) contained in the received beacons that represent the network with the NWID in which the devices are operating. Alternatively the devices may be required to select the schedule which to follow based on some other criteria than the TSF value. Beacons may, as an example, contain some other information than the TSF that is used by the devices to determine which schedule to use.

When the radio and MAC of a wireless device transmits a Beacon, the Beacon MAC-header contains device's own current TSF value. The device may automatically transmit a reply message when it receives a Beacon from another network, the reply message being referred herein as a beacon response message. The beacon response message contains the current TSF value of the replying network. Alternatively the beacon response message may contain other information that is used to determine which schedule to use.

Wireless devices form a network where all devices in proximity may communicate with each other. When two or more groups of devices forming two or more instances of the network come close to each other, the two or more instances may merge to become one network instance. Devices may make a merging or join decision to change the instance autonomously based on the TSF information collected from Beacons received during scan periods or based on the TSF information collected from received beacon response messages. A merging decision may be performed when a device receives a Beacon or beacon response message with an older (greater) TSF value from another wireless device. Alternatively a merging decision may be done based on some other information available in a Beacon or beacon response message from another wireless device. After the merging decision has been performed by a device, the device moves into the new network instance.

The awareness functionality in a short-range wireless device may be divided between four layers in the awareness architecture. The Awareness Layer and the Community Layer provide services for applications, i.e. provide the awareness API. The approximate functional split between the different layers is as follows.

Awareness Layer

According to an embodiment, Awareness Layer (AwL) has the highest level of control of the awareness architecture. Example services the AwL offers to the applications comprise Publish and Subscribe. The Awareness Layer receives publish and subscribe requests from applications and maps these into queries and query responses that, in turn, are mapped as awareness messages, the Network Layer PDU, that traverse from device to device. It also maps the awareness messages received by the device, to the application. The network layer does not appear as a data pipe for applications. A single awareness message is self-contained and short, the AwL compresses the messages in order for them to consume as little resources as possible.

The Awareness Layer may comprise an internal storage of awareness data items. Publishing an item normally means storing it in this internal storage (passive publish). Such an item is visible to other devices in the local vicinity and may be found using the Subscribe service. It is also possible to use active publishing that causes the Awareness Layer to issue a publish message that propagates from device to device. It is the responsibility of the AwL to decide whether a received message leads to the notification of an application (filtering). Items may be marked to be visible to only certain communities, so that they are visible only to searches made by members of such a community.

The Subscribe request causes the Awareness Layer to issue either a single or repetitive query message(s) that eventually propagate to other devices in the local vicinity (by using the functionality of lower awareness layers). When such a query message reaches the AwL of a device that happens to possess a matching information item, it responds with a reply message. The lower layers of awareness architecture take care of the routing of such a message back to the AwL of the querying device, which notifies the application of the other device that issued the Subscribe request.

Community Layer

The concept of communities has been integrally built into awareness architecture. Awareness communication may be visible to all the devices, or just to those that belong to a certain community. Regardless of this visibility, all wireless devices take part in the routing of messages. The role of the Community Layer (CoL) is to implement the community visibility rules. Only those messages that a certain device has visibility to (i.e. a device belongs to the same community as the message) are passed to the AwL. As an additional level of community privacy, messages are encrypted by the Community Layer. To allow such message filtering and encryption/decryption, the CoL stores the community credentials for those communities to which the user of the device belongs. The default awareness community (all local users) does not use any credentials and therefore its messages simply pass through the Community Layer.

According to an example embodiment, Awareness architecture comprises three different kinds of communities: the default awareness community, peer communities and personal communities. Communities may also be categorized with their privacy. Messages of public communities are transmitted as plain text whereas messages of private communities are transmitted encrypted. The default awareness community is the default community for all wireless devices. Awareness community messages are not encrypted and every node may send and receive awareness community messages (public community). In a peer community all members are equal and every member may receive all the community specific messages. A peer community may be public, or it may be private meaning that community messages are encrypted using a temporary key derived from the community specific shared key. The encryption function may be based on Advanced Encryption Standard, EAX mode (AES/EAX) with 128 bit keys. A personal community has a community owner that manages the community. A non-owner community member may communicate with the owner but not with other members of the community. A personal community is private, meaning that community messages from the owner to other members may be encrypted.

Network Layer

The Network Layer (NL) takes care of the local dissemination of the awareness messages. This is accomplished by way of a smart-flooding algorithm that attempts to adapt to the surrounding device density. At high densities, very few devices participate in the transmission of a given message. At low densities, all the devices may retransmit each message (normal flooding). The awareness network has a flat hierarchy; none of the devices may assume any special roles. Thus, at high densities, all the devices will transmit approximately the same amount of traffic (no clustering). The Network layer may also take care of the routing of the replies back to the device that issued the search. To this end, it collects routing information from the messages that flow through it. It also keeps track of all the neighbors and their approximate distance. Normally, reply routing uses unicast transmissions, whereas flooding messages are always broadcasted. All the messages received by the Network Layer are passed to Community Layer in order to check whether the message should be processed in the AwL.

Link Layer

Link Layer performs the adaptation between the underlying radio technology (e.g. IEEE 802.11 WLAN physical layer) and the Network Layer. It maps the specific information of the radio technology, such as radio identifiers and received signal strengths, into technology neutral information used by the Network Layer (NL). Multiple Link Layer instances may be used by the NL, e.g. for simultaneous usage of different radio technologies.

The Link Layer may be divided into two sub layers: logical link control (LLC) and media access control (MAC). LLC provides radio technology agnostic service for the Network Layer. It hides differences between radio technology specific MACs. LLC provides a single service access point for the Network layer. LLC knows how to map the generic provided service to the service provided by the technology specific MACs. The LLC internal data structures include the Neighbor Table that contains information of all the neighboring devices that have been heard in the recent past.

The Link Layer tries to transmit data via the given medium using the TransmitData functionality. Transmission may succeed or it may fail. Internally the Link Layer may try transmissions several times if a medium is temporarily busy. The Link Layer passes all the messages it receives to the Network Layer. This also includes unicast messages that are intended for other nodes.

The logical link control (LLC) is aware of radio technology specific MACs. In case of the IEEE 802.11 WLAN MAC example, the LLC does the following WLAN MAC specific actions:

Control (Reset, Configure) WLAN MAC.

Decide when to merge WLAN networks.

Construct a message package to be sent to WLAN MAC from outgoing messages.

Select which messages are to be sent and which are ignored immediately, e.g. if there are too many messages to be sent.

Extract incoming data messages contained in reception reports.

Update the Neighbor Table when reception reports and scan reports are received.

Merging of WLAN networks may be the responsibility of the logical link control (LLC). The LLC may determine when to merge two WLAN network instances or beacon groups as a single larger network instance or a beacon group. LLC may calculate an estimate of its own WLAN network size. Estimation may be based on information provided by the Network Layer, information found in the LLC Neighbor Table and network size category shared by other nodes. A network size category is calculated from an estimated network size.

The IEEE 802.11 WLAN MAC awareness mode enables a wireless device to use its power efficiently. In the awareness mode, the WLAN radio is asleep most of the time, thus reducing power consumption. Messages are transmitted and received in a batch mode, i.e. LLC passes all the messages that the MAC is to transmit during a single awake period, in a single package. The MAC passes all the messages received during a single awake period in a single reception report. The LLC collects messages to be transmitted in a single package. When the MAC is awake, the LLC passes the package to the MAC and it tries to transmit the messages. When the MAC is about to go asleep, it sends a transmission report to the LLC containing information about messages it has succeeded to transmit and about messages it has failed to transmit. In addition MAC passes a reception report to LLC. The report contains messages received during the awake period.

According to an embodiment, the merging or joining process is a purely local process that occurs entirely internally to the wireless device. There is no indication to the outside world that a device has joined a particular ad hoc network. Joining an ad hoc network may require that all of the mobile device's MAC and physical parameters be synchronized with the desired ad hoc network. To do this, the device may update its timer with the TSF value of the timer from the ad hoc network description, modified by adding the time elapsed since the description was acquired. This will synchronize the device's timer to the ad hoc network. The BSSID of the ad hoc network may be adopted, as well as the parameters in the capability information field. Once this process is complete, the wireless device has joined the ad hoc network and is ready to begin communicating with the wireless devices in the ad hoc network.

The IEEE 802.11 WLAN MAC awareness mode provides the following functionalities:
Reset MAC.
Configure MAC.
Join a WLAN network or create a new network.
Join an existing WLAN network (BSSID is known).
Set a template for beacon frames so that LLC parameters can be passed in WLAN beacon frames.
Try to transmit a set of messages.
Receive a set of incoming messages.
Receive a set of WLAN scan messages
Message Propagation According to an embodiment, the propagation of an awareness search message is conducted in the awareness architecture layers of different devices. An application initiates a subscription in the device by using the Subscribe service offered by the Awareness Layer. The Awareness Layer realizes the subscription by sending a query message to other devices. In all the devices the message goes at least up to the Community Layer. However, only in those devices that belong to the community to which the message was intended, does the message proceed to the AwL. There is no need to have an application present in the replying device. It is sufficient to only have the awareness platform active.

C. Neighbor Awareness Networking (NAN)

In accordance with an example embodiment, the invention may be used in the logical architecture of the Neighbor Awareness Networking (NAN) program being standardized by the Wi-Fi Alliance (WFA). The program is publicly known as Wi-Fi Aware™.

A NAN Network operates in only one channel in the 2.4 GHz frequency band and, optionally, in one channel in the 5 GHz frequency band of the spectrum used by IEEE 802.11. The NAN Channel in the 2.4 GHz frequency band shall be channel 6 (2.437 GHz).

A NAN Device is any device that implements the NAN protocol. A NAN Cluster is a collection of NAN devices that are synchronized to the same Discovery Window schedule. A NAN Device that creates a NAN Cluster defines a series of discovery window starting times exactly 512 TUs apart in the mandatory 2.4 GHz frequency band NAN Channel. NAN Devices participating in the same NAN Cluster are synchronized to a common clock.

NAN Synchronization Beacon

A NAN Synchronization Beacon is a modified IEEE 802.11 Beacon management frame transmitted inside NAN Discovery Windows used for NAN timing synchronization. A TSF keeps the timers of all NAN Devices in the same NAN Cluster synchronized. The TSF in a NAN Cluster shall be implemented via a distributed algorithm that shall be performed by all NAN Devices. Each NAN Device participating in a NAN Cluster shall transmit NAN Beacon frames according to the algorithm described in this clause.

A Discovery Window starts at each discovery window starting time. The discovery window duration shall be 16 TUs. During a discovery window, one or more NAN Devices transmit NAN Synchronization Beacon frames such that all NAN Devices within the NAN Cluster synchronize their clocks. A NAN Device transmits at most one NAN Synchronization Beacon frame within one discovery window.

NAN Service Discovery Frame

During a discovery window, one or more NAN Devices transmit a NAN Service Discovery frame, which is a Vendor Specific Public Action frame. The NAN Service Discovery Frame is an IEEE 802.11 management frame, transmitted by a NAN device in a NAN cluster. NAN Service Discovery frames enable NAN Devices to look for services from other NAN Devices and make services discoverable for other NAN Devices. There are two NAN Service Discovery protocol messages defined in the NAN Service Discovery Protocol:
1. Publish message
2. Subscribe message The NAN Service Discovery protocol messages are carried in Service Descriptor attributes that are carried in the NAN Service Discovery frames. A NAN Device may use a NAN Service Discovery frame to actively look for availability of a specific service. When a NAN Device uses a Subscribe message, it asks for other NAN Devices operating in the same NAN Cluster to transmit a Publish message when response criteria are met. A NAN Device may use a Publish message to make its service discoverable for other NAN Devices operating in the same NAN Cluster in an unsolicited manner. The Service Control field indicates if the Service Descriptor attribute corresponds to Publish, Subscribe, or Follow-up function and if other optional fields are present in the Service Descriptor attribute such as Matching Filter, Service Response Filter, and Service specific information.

The NAN Service Discovery Frame is an IEEE 802.11 management frame that includes fields for Frame Control, Duration, Receive address (NAN Network ID), Transmit address, Cluster ID, Sequence Control, HT Control (presence indicated with the Frame Control), the NAN Service Discovery Frame Body, and a cyclic redundancy code (CRC). The NAN Service Discovery Frame Body includes NAN attributes specifying, for example, service ID attributes and service descriptor attributes. A service descriptor attribute may be used in NAN Service Discovery Frame.

NAN Discovery Beacon Frames

Between discovery windows, one or more NAN Devices transmit NAN Discovery Beacon frames to enable NAN Devices to discover a NAN Cluster. Each NAN Device in a Master role shall transmit NAN Discovery Beacon frames outside NAN Discovery Windows in order to facilitate the discovery of the NAN Cluster. A NAN Discovery Beacon is a modified IEEE 802.11 Beacon management frame transmitted outside NAN Discovery Windows.

The NAN protocol stack in a NAN device is expected to comprise of two components: 1) NAN Discovery Engine, 2) MAC with NAN support. MAC with NAN support provides means for NAN devices to synchronize in time and frequency to provide common availability periods for service discovery frames from/to the NAN Discovery Engine.

NAN Discovery Engine

The NAN Discovery Engine provides Publish and Subscribe services to the applications for service discovery purposes.

Publishing is the ability to make application-selected information about e.g. capabilities and services available for other NAN devices that seek information with Subscribing, using protocols and mechanisms certified by the Neighbor Awareness Networking program. NAN devices that use Publishing may provide published information in an unsolicited or solicited manner. Publishing is defined for a Wi-Fi NAN as a mechanism for an application on a NAN Device to make selected information about the applications capabilities and services available to other NAN devices.

Subscribing is the ability to discover information that has been made available in other NAN devices with Publishing, using protocols and mechanisms certified by the Neighbor Awareness Networking program. NAN devices that use Subscribing may passively listen for or actively seek published information. Subscribe is defined for a Wi-Fi NAN as a mechanism for an application user to gather selected types of information about capabilities and services of other NAN devices.

An application may request Publish and Subscribe services to run in a certain type of NAN network, in any type of NAN network, or in all types of NAN networks. The NAN network type selection determines whether the discovered Publish and Subscribe services are intended to happen in isolated clusters, among the NAN devices that are close by, or among all the NAN devices that are within range of the NAN device. Network type selection, per NAN Discovery Engine service, is reflected in the lower levels of the NAN stack, handling the NAN network and cluster selection functions. When a Publish/Subscribe service has been configured to run in one type of network, corresponding functionality and discovery protocol message exchanges are made to happen only in a network of the same type. As discussed herein, the terms cell and cluster refer to the same thing.

Publish and Subscribe services are expected to exploit a discovery protocol that the NAN Discovery Engine implements and which are designed for NAN. The protocol is expected to have three different protocol messages: 1) Discovery query message, 2) Discovery response message, and 3) Discovery announcement message. The Subscribe service is expected to use the Discovery query message to conduct active discovery. The Subscribe service may be configured to operate in passive mode only. In this mode, no Discovery query messages are transmitted, but one listens for Discovery responses and Discovery announcement messages to find the information sought. The Publishing service is expected to use the Discovery response message and Discovery announcement message to announce availability of application-selected information to discovering devices. The Discovery response message is intended to be used as a response to a received Discovery query that meets response criteria. The Discovery announcement message is intended to be used to implement unsolicited Publishing service.

A device, in which the Subscribe service has been activated in active mode, transmits Discovery query messages to trigger Publishing devices to transmit Discovery response messages. In parallel, the Subscribing device monitors received Discovery responses and Discovery announcement messages to determine the availability of services and information being sought. Monitoring is envisioned to be a continuous process that applies to all Discovery response and Discovery announcement messages received while the Subscribe service is active. With this approach, a Subscribing device may gather valuable information from Discovery responses and from Discovery announcement messages that are independent from its own Discovery query message transmissions.

Each publish/service instance is given at least a service name (UTF-8 string) which identifies the service/application and which is used in the NAN Discovery Engine to generate a 6-octet service identifier (SID) value using a specified hash function. This SID is used as the primary matching criterion when looking for specific services. Thus this SID is transmitted in each publish and subscribe message to allow the message receiver to check whether a match occurs or not. Each publish/service instance may also be given further criteria for service discovery. This is called a matching filter. If a matching filter is given, the NAN Discovery Engine needs to use not only the SID for matching, but also the matching filter information is used. The basic idea is that there has to be a perfect match between both the SID and the matching filter from a publisher and from a subscriber in order to have success in discovery. Whenever a matching filter is given to the NAN Discovery Engine for subscribe/publish purposes, this matching filter is also carried along with the SID in subscribe/publish messages.

Additionally, each publish/service instance may be given service specific information that is not used in discovery, itself, and not in matching, but it is information that is communicated to the service/application layer in case of a SID/matching_filter match. Thus, this information is also carried in publish and subscribe messages to peer devices.

Both publish and subscribe messages are carried over the air in the form of a Service Descriptor Attribute. Each attribute represents one publish or subscribe instance and contains at least a SID and optionally matching filter and service specific information. Service Descriptor Attributes are carried in NAN Service Discovery Frames, which are vendor specific public action frames. A very limited amount of service discovery information may also be carried in NAN Beacon frames that may contain some of the NAN attributes in NAN information element (IE). One such an attribute is Service ID attribute that may contain a variable number of SIDs that may be set to indicate a selected set of published services. NAN Beacons and Service ID attributes within them may not be used for subscribe purposes, but one may indicate only published services and their SIDs.

MAC with NAN Support

The MAC is responsible for acquiring and maintaining time and frequency synchronization among devices that are close by, so that the devices are available for discovery protocol message exchange in same channel at same time. Synchronization happens through dedicated synchronization frames that are transmitted by so called master devices (on default) at the beginning of the availability periods. Sync frames are transmitted periodically in certain channels. Periodicity and channel usage is determined by sync frame parameters. Each device needs to be capable of acting as a master device and each device is expected to determine for each availability period whether it is a master device or not. This determination is done through a master election algorithm. The synchronization frames determine the schedule (time and frequency) of both the synchronization frame transmissions and the availability periods or discovery windows.

A NAN network is comprised of a set of NAN devices that operate under a common network identifier (NAN ID) and that share common sync frame and discovery window parameters. A NAN network comprises of one or more NAN clusters. Each NAN cluster may be a contention group or beacon group and may be considered a local representation of a NAN network. A NAN cluster is comprised of a set of NAN devices that operate in a NAN network with one NAN ID and which are synchronized with respect to both the sync frame transmissions and the discovery windows. In order for NAN devices to form a NAN cluster, at least some of them need to be within range of each other. The NAN ID is carried at least in synchronization frames that may be of a beacon frame format. Each beacon contains a NAN ID field that is used in a NAN device receiving a beacon, to determine, as an example, whether the beacon is from a NAN network in which the NAN device is operating and from what type of NAN network the beacon was transmitted. In one embodiment of the invention, the NAN ID is a numerical value that is indicated with a 6-octet field in beacons or in synchronization frames used in the NAN networks, to provide basic synchronization within NAN clusters. In one embodiment of the invention, there is no NAN cluster identifier that would be carried in beacon frames, but NAN cells are differentiated with different schedules especially from perspective of sync frame (beacon) schedule.

The NAN Discovery Engine leverages a variant of the Wi-Fi MAC which has features that have been specifically developed to allow low power discovery directly between devices within range. This MAC with NAN support provides synchronization in addition to frame transmit and receive services. The objective of the synchronization is to make all the NAN devices within range available for service discovery exchange at same time on same frequency channel. The synchronization builds upon Beacon frame transmissions in which all the NAN devices are involved. Beacon frames are transmitted periodically and they serve also as NAN network instance identifiers for devices that look for NAN network instances (NAN cluster is a NAN network instance). A NAN device which looks for a NAN network instance uses traditional Wi-Fi passive scanning by listening for Beacon frames from NAN devices. Typically a NAN device performs passive scanning once in 10-20 seconds and each scan lasts 200-300 ms each. Once a NAN device finds out one or more NAN network instances, it selects the instance to which it synchronizes and starts operating in.

A NAN Concurrent Device is a NAN Device that is capable of operating in a NAN network and other types of Wi-Fi networks, such as WLAN infrastructure, IBSS, and Wi-Fi Direct.

Basic Principles of NAN Operations:
Upon activating the NAN functions in a device, the device first looks for a NAN network by means of passive discovery. The NAN functions are activated by an application in the device requesting either the Subscribe or the Publish service to be activated, when there is no service active in the NAN Discovery Engine.
  a) On default there is at least one NAN ID that is determined in a NAN specification and the NAN device looks for such a network and its clusters.
Joining a NAN network/NAN cluster: If the device finds at least one NAN cluster that the device may join, the device selects a cluster and joins it. If the device finds no NAN cluster that the device may join, the device establishes a NAN cluster of its own. An application may have also requested the Publish service to be activated in a passive mode. In such case the device doesn't ever establish a NAN cluster, but it only operates in NAN clusters that have been established by others.
  a) A NAN device may join a NAN cluster when the following criterion is met:
    1. The device receives at least one sync frame from the cluster with signal level exceeding a pre-determined threshold RSSI_C (e.g. −50 dBm).
Upon joining a NAN cluster a NAN device synchronizes itself both to the sync frame transmission and discovery window schedule of the cluster.
  a) Additionally, the device is responsible for running the master election algorithm to determine whether it is a master device that is responsible for transmitting a sync frame.
Once in a NAN cluster, a NAN device may continue operating in it, as long as one of the following criteria is met:
  a) The device receives at least one sync frame from the cluster with signal level exceeding a pre-determined threshold RSSI_C (e.g. −50 dBm).
  b) The device operates as a master device transmitting sync frames.
When operating in a NAN cluster, a NAN device is responsible for maintaining both the base clock of the cluster by transmitting sync frames as needed and the discovery window schedule of the cluster.
Additionally, a NAN device is responsible for conducting passive discovery once a while to figure out whether there are other NAN clusters within range that that the device should consider joining
  a) When a NAN device detects a sync frame of a NAN cluster different from the one in which the device operates, but both the clusters belong to the NAN network the device operates in, and the sync frame is received with signal level exceeding a pre-determined threshold RSSI_C (e.g. −50 dBm), the device proceeds as follows:
    1. If the sync frame from the foreign cluster contains parameter values that indicate preference of the foreign cluster over one's own cluster, the device moves its operations to the foreign cluster.
    2. Otherwise the device continues its operations in the current cluster.
Neighbor Awareness Networking Network
A NAN network is comprised of a set of NAN devices that operate under a common network identifier (NAN ID) and that share common sync frame and discovery window parameters.
A NAN network is comprised of one or more NAN clusters.
In accordance with an example embodiment of the invention, two NAN network types are defined:
  a) Network of synchronized clusters.
  b) Network of isolated clusters.
Network identifier (NAN ID) depends on the network type.
  a) In a preferred implementation the NAN specification determines at least two NAN ID values and for each ID value the specification also determines the network type.
The network type determines whether discovery window schedules are aligned across cluster borders (network of synchronized clusters) or whether discovery window schedules are local to the cluster with the objective to especially keep adjacent/overlapping clusters unsynchronized from the perspective of discovery windows.
  a) In a network of synchronized clusters, the objective is to maximize use of one and same discovery window schedule.
  b) In a network of isolated clusters, the objective is to keep the clusters operating with their own discovery window schedules, so that only those devices that operate in same cluster are available for NAN discovery frames at a same time, in a same channel.

Cluster

A set of NAN devices that operate in a NAN network with one NAN ID and that are synchronized with respect to both the sync frame transmissions and the discovery windows form a NAN cluster.

In order for NAN devices to form a NAN cluster, at least some of them need to be within range of each other.

Synchronization within a NAN cluster means that the devices share the burden of sync frame transmission and are available simultaneously for NAN discovery during discovery windows.

Depending on whether a cluster belongs to a network of synchronized clusters or to a network of isolated clusters, the NAN devices moving from a cluster to another have certain obligations that are discussed in more detail later.

Sync Frames

Sync frames form the basis of time and frequency synchronization in the NAN network. All the NAN devices are responsible for participating in sync frame transmission, as per master role selection rules.

Sync frames are transmitted as per sync frame parameters that determine how often and in which channel(s) the frames are transmitted.

Sync frames provide a base clock for NAN devices and the base clock is used as the reference when specifying the discovery window schedule.

The base clock builds upon the time synchronization function (TSF) that is used in WLAN, and each sync frame is expected to contain a TSF timestamp value indicator.

A sync frame may be realized as a Beacon frame.

Discovery Window

A discovery window is a time period during which NAN devices are available for NAN discovery frame exchange.

Discovery windows happen as per discovery window parameters that determine how often and in which channel(s) the windows happen.

Discovery window schedule builds upon the information available in sync frames.

Discovery window schedule may be NAN cluster specific or same across NAN cluster borders depending on the NAN network type.

Both NAN Synchronization Beacons and NAN Service Discovery Frames are transmitted during Discovery Windows. The time and channel on which NAN Devices converge is called Discovery Window. Each discovery windows is 16 TUs (1.024 ms) long and time difference between start times of two consecutive DWs is 512 TUs. The assumption is that only NAN Discovery Beacons are transmitted outside the DWs.

Discovery Windows shall happen in the 2.4 GHz and specifically in channel 6. NAN Devices may also use the 5 GHz for NAN operation. If they do so, they schedule separate discovery windows for 2.4 GHz and 5 GHz. The 2.4 GHz DW schedule is, however, the basis of 5 GHz discovery window schedule. 5 GHz discovery windows will be equal in size with the ones in 2.4 GHz and in both bands the discovery window period is 512 TUs. The first discovery window in 5 GHz band is in offset of 128 TUs from the first discovery window in the 2.4 GHz band.

A NAN network comprises all NAN Devices that share a common set of NAN parameters that include: the time period between consecutive DWs, the time duration of the DWs, the beacon interval, and NAN channel(s). A NAN Cluster is a collection of NAN devices that share a common set of NAN parameters and are synchronized to the same DW schedule. A NAN Cluster is identified with the NAN Cluster identifier (ID). NAN devices that are part of the same NAN Cluster participate in the NAN Master selection procedure. That means in practice that each NAN device that operates in a NAN Cluster is responsible for participating in beaconing in the NAN Cluster.

Device Operations in a NAN Network

Upon activating the NAN in a device, the device first looks for a NAN network by means of passive discovery.

On default, there is one default NAN ID that is determined in a NAN specification and the NAN device looks for such a network and its clusters.

Joining a NAN network/NAN cluster:

If the device finds at least one NAN cluster that the device may join, the device selects a cluster and joins it.

If the device finds no NAN cluster that the device may join, the device establishes a NAN cluster of its own. If the NAN Discovery Engine has been requested to activate the Subscribe service in a passive mode, the device may also decide not to establish a NAN cluster of its own, but it only operates in NAN clusters it discovers.

When a NAN device operates in a NAN cluster, it periodically conducts passive discovery to find out whether other NAN clusters of the NAN network in which the device operates, are available.

Joining a NAN Cluster

A NAN device may join a NAN cluster when the following criterion is met:

The device receives at least one sync frame from the cluster with signal level exceeding a pre-determined threshold RSSI_C (e.g. −50 dBm).

Upon joining a NAN cluster, a NAN device synchronizes itself both to the sync frame transmission and discovery window schedule of the cluster.

Additionally, the device is responsible for running the master election algorithm to determine whether it is a master device that is responsible for transmitting a sync frame.

Operating in a NAN Cluster

A NAN device may continue operating in a NAN cluster as long as one of the following criteria is met:

The device receives at least one sync frame from the cluster with signal level exceeding a pre-determined threshold RSSI_C (e.g. −50 dBm).

The device operates as a master device transmitting sync frames.

When operating in a NAN cluster, a NAN device is responsible for maintaining both the base clock of the cluster by transmitting sync frames as needed, and the discovery window schedule of the cluster.

Master Election

In accordance with an example embodiment of the invention, a node, device, or STA may operate in one of two roles: As a Master Sync STA, it competes with other Master STAs to transmit a Beacon. As a Non-Master Sync STA, it does not compete to transmit a Beacon. The Master Sync STA role may be determined by the Master Election Algorithm for Neighbor Awareness Networking. Every node, device, or STA of an ad hoc network may need to be able to operate in both roles and the Master Election Algorithm may need to be run by every node, device, or STA once in a while or periodically.

A NAN device that operates in a NAN cluster may need to be responsible for determining for each discovery window, as per the master election algorithm, whether it is a master device.

A Sync Frame from a Foreign Cluster

When a NAN device detects a sync frame of a NAN cluster different from the one in which the device operates, but both the clusters belong to the NAN network the device operates in, and the sync frame is received with signal level exceeding a pre-determined threshold RSSI_C (e.g. −50 dBm), the device proceeds as follows:

If the timestamp (e.g. TSF value) in the sync frame from the foreign cluster is larger than the time in one's own cluster, the device moves its operations to the foreign cluster.

Alternatively some other information in the sync frame from the foreign cluster is analyzed to determine whether the device moves its operations to the foreign cluster.

Otherwise the device continues its operations in the current cluster.

Moving Operations to a New Cluster

When a NAN device operates in a network of synchronized clusters, it shall do as follows when moving its operations to a new cluster upon detecting the existence of the new cluster through passive discovery:

a) If the device is a master device in the current/old cluster, the rules are as follows:

The device transmits as a master device in the current/old cluster at least one sync frame that contains information about the new cluster. This includes information at least about TSF value and discovery window schedule of the new cluster.

Once the device has transmitted at least one sync frame in the current/old cluster with information about the new cluster, it shall start operating in the new cluster and ceases all the operations in the old cluster.

b) If the device is a non-master device in the current/old cluster, the rules are as follows:

The device shall start operating in the new cluster and ceases all the operations in the old cluster.

When a NAN device operates in a network of isolated clusters, it shall do as follows when moving its operations to a new cluster:

a) Regardless of whether the device is a master or a non-master device in the current/old cluster, the device shall start operating in the new cluster and ceases all the operations in the old cluster.

Aligning Discovery Window Schedules

When a NAN device operates in a network of synchronized clusters, it shall do as follows upon detecting the existence of the new cluster from a received sync frame that contains information about the new cluster and the new cluster is indicated to be the one whose discovery window is to be used:

a) If the device is a master device in the current/old cluster, the rules are as follows:

The device may transmit as a master device in the current/old cluster at least one sync frame that contains information about the new cluster.

The device starts using the discovery window schedule of the new cluster.

The device may activate passive discovery to find out whether it can detect the new cluster and whether it can receive sync frames from the new cluster with high enough signal level in order to synchronize from perspective of sync frame transmissions.

b) If the device is a non-master device in the current/old cluster, the rules are as follows:

The device starts using the discovery window schedule of the new cluster.

The device may activate passive discovery to find out whether it can detect the new cluster and whether it can receive sync frames from the new cluster with high enough signal level in order to synchronize from perspective of sync frame transmissions.

D. Neighbor Awareness Networking Service Discovery Proxy

In accordance with an example embodiment, the invention may be used in the logical architecture of Neighbor Awareness Networking (NAN).

In an example embodiment of the invention, the NAN service discovery proxy functionality is implemented as a NAN service.

In an example embodiment of the invention, enhancements to the NAN specific signaling allow discovery of NAN service discovery proxy server.

In an example embodiment of the invention, enhancements to the NAN specific signaling allow registration of a service publish/subscribe to a proxy server.

In an example embodiment of the invention, enhancements to the NAN specific signaling allow management of a proxied service publish/subscribe in a proxy server.

In an example embodiment of the invention, enhancements to the NAN specific signaling allow information exchange on proxied service publish/subscribe.

In an example embodiment of the invention, proxying comprises devices in three different roles: NAN2 proxy server, NAN2 proxy client, and a 3rd NAN2 device. The NAN2 proxy client is a NAN2 device aiming to save some battery by delegating away some of its service discovery functionality. The NAN2 proxy server may be a mains powered NAN2 device, which is willing to operate as a proxy server, to help NAN2 proxy clients to save some power. The 3rd NAN2 device, in this case, is the device that operates the same service as the NAN 2 proxy client and who should discover the NAN2 proxy client's service through the NAN2 proxy server. The NAN2 proxy client may use a NAN2 proxy server for publish and/or subscribe as applicable and as available in the NAN2 proxy servers in proximity.

1) Proxy Server Discovery

There are several different options how a NAN2 proxy server can make itself available and discoverable. The most logical approaches are as follows:

a) Extension of NAN Connection Capability Attribute b) Extension of NAN Beacons c) Definition of a new NAN Attribute d) Implementation of the NAN service discovery proxy as a NAN service (preferred)

An example embodiment of the invention is to specify the proxying as a NAN service. A reserved service name, allocated by Wi-Fi Alliance, is used (e.g. org.wi-fi.aware.sd-proxy) and the service should be running on the NAN stack, instead of forwarding the information outside the stack. With this approach a NAN2 device that offers NAN2 proxy server capability/support/service for use by NAN2 proxy clients publishes the service. In other words, the device makes its NAN discovery engine to publish the proxy service like any other service either in solicited or unsolicited manner, or using the both publish types simultaneously. The service discovery frame that carries a publish message with the Service ID corresponding to the service name reserved for the NAN service discovery proxy should include:

a) Service Descriptor, and b) Further Availability Map (FAV)

FIG. 1 illustrates an example network diagram of a proxy server wireless device A2, a proxy client wireless device A1, and a third wireless device A3 that are operating in a neighbor awareness network cluster 100. The proxy server has composed a service ID indicating support for providing proxy service discovery for other wireless devices operating in the neighbor awareness network. The proxy server is shown transmitting a wireless service discovery frame 101 to the neighbor awareness network, the service discovery frame including the composed service ID, in accordance with at least one embodiment of the present invention. The service discovery frame 101 may include a publish message that includes the service ID.

FIG. 1A shows an example format of the wireless service discovery frame 101, which is a publish message transmitted by the proxy server A2, in accordance with at least one embodiment of the present invention. The Service Descriptor shown in the figure, provides details of the proxy service available. It contains, as an example, the following indicators:

a) A field that indicates whether the proxy server is available for proxied publishes or for proxied subscribes or for both.

a. As an example, two bit field can be used for this purpose where one of the bits is used to indicate availability of proxied publish and the other bit is use to indicate availability of proxied subscribe. Value '1' may be used to indicate that the proxied publish/subscribe is available and value '0' may be used to indicate that it is not available.

b. Note: In an example embodiment, a proxy server supports proxied publish, and proxied subscribe is optional to support. Proxied publish doesn't necessarily require a proxy server to do anything else except transmit publish messages on behalf of the proxy client, either in solicited or unsolicited manner. Proxied subscribe, on default, may require the proxy server to store discovery results. Some proxy servers may not be ready to do this and thus proxied subscribe may be made optional to support.

b) A field that indicates what type of proxied publish is available in the proxy server.

a. Two bit sub-field, one bit to indicate support ('0' not supported, '1' supported) for solicited publish, another bit to indicate support ('0' not supported, '1' supported) for unsolicited publish.

b. One bit sub-field to indicate whether the proxy server may gather information about detected NAN subscribes that match the proxied publish for the proxy client to retrieve. If set to '1', the proxy server is able to gather information about detected NAN subscribes. If set to '0', the proxy server is not able to gather information about detected NAN subscribes, but just transmits proxied publish messages on behalf of the proxy client.

c) A field that indicates what type of proxied subscribe is available in the proxy server.

a. Two sub-bit field, one bit to indicate support ('0' not supported, '1' supported) for active, another bit to indicate support ('0' not supported, '1' supported) for passive publish.

b. One bit sub-field to indicate whether the proxy server may gather information about detected NAN publishes that match the proxied subscribe for the proxy client to retrieve. If set to '1', the proxy server is able to gather information about detected NAN publishes. If set to '0', the proxy server is not able to gather information about detected NAN publishes, but just transmits proxied subscribe messages on behalf of the proxy client.

d) A field that indicates maximum time-to-live for the proxied publish/subscribe a. A one octet field, as an example, which indicates how long at maximum the proxy server may keep on running proxied publish/subscribe without any message exchange with a proxy client. The preferred solution is to have the field to indicate the time as a number of consecutive NAN discovery windows.

e) A field that indicates minimum periodicity for transmissions of publish/subscribe messages related to the proxied publish/subscribe.

a. A one octet field, as an example, which indicates whether the proxy server may transmit publish/subscribe messages for proxied publish/subscribe in every NAN discovery window, in every second DW, every fourth DW, every eighth DW, etc.

f) A field that indicates whether the proxy server is available to operate for proxying in every NAN discovery window or only during some of the discovery windows a. A one octet field, as an example, which indicates whether the proxy server is available to operate for proxied publish/subscribe in every NAN discovery window or in a fraction of the NAN discovery windows (e.g. every second NAN discovery window, every fourth DW, etc.)

The Further Availability Map (FAV) describes the time and frequency when the NAN2 proxy server is available for NAN2 proxy clients for any of the proxy session management related communication (i.e. registration, keep alive messaging, deregistration, etc. as specified hereafter). Another embodiment may be to allow NAN2 proxy clients to register their services during the discovery windows (DW), but the DW should be protected from excess usage to leave enough room for the real discovery.

2) Proxy Session Management

Proxy session management refers to means that are used by proxy server/client to a) register a service publish/subscribe to a proxy server, b) maintain registration, and c) deregister proxied publish/subscribe from proxy server.

In the registration a proxy session will be formed by request from a proxy client. Once established, a proxy session is maintained by the proxy client until the session is torn down either on request or automatically e.g. upon expiry of the session timeout.

A dedicated protocol will be used for proxy session management and the preferred approach is to have the protocol designed using the NAN follow-up messages as the basis. The preferred approach is to have these messages transmitted during time periods and in channels that the proxy server indicates available for proxy session management communication. The NAN Further Availability window (FAV) may be used for the purpose.

The follow-up messages are carried in the NAN service discovery frames and they were originally designed to be carried between service/application layers of two peer NAN devices once the devices have completed NAN service discovery successfully. A NAN service discovery frame that contains a follow-up message is a unicast frame with the Service ID and the Instance ID fields carrying values that identify the service and the service instance to which the message is targeted.

In the case of NAN proxy session management protocol, the Service ID is set to the value that corresponds to the service name assigned and allocated for the NAN service discovery proxy (e.g. org.wi-fi.aware.sdproxy). The Instance ID is used as specified in the NAN specification and will be set to the value indicating the peer device's NAN service discovery proxy instance to which the follow-up message is targeted and it is obtained from the publish message 101 received from the proxy server A2. The Service Info field that per the NAN specification carries service/application specific information will be designed to contain information that relates to the proxy session management.

Thus the Service Info field contains all the detailed information one needs to carry in NAN proxy session management protocol messages while the Service ID field serves as a kind of protocol identifier in follow-up messages that are exchanged between service layers of two NAN service discovery proxy devices. First few fields of the Service Info field are expected to contain a generic proxy session management message header that will contain, as an example, a field which is used to indicate whether the message contains a proxy registration request or a proxy registration response. The following sub-sections describe each dedicated message type more in details with the assumption that the message header contains information that identifies the message.

2.1) Proxy Session Registration

Once a proxy client A1 discovers an available proxy server through normal NAN service discovery, it may request the server to perform service publish/subscribe on its behalf. As a requestor it acts like a service/application layer in a device requesting publish/subscribe service from the NAN discovery engine in the device. This time the request is just from a device to another and between two instances of the NAN service discovery proxy layers.

FIG. 2 illustrates the example network diagram of FIG. 1, wherein the proxy client A1 has received the wireless service discovery frame 101 from the proxy server A2, including the service ID indicating support by the proxy server for providing proxy service discovery for wireless devices operating in the neighbor awareness network. The figure shows the proxy client A1 transmitting to the proxy server A2, a service discovery proxy registration request 102, in response to the receiving of the wireless service discovery frame 101, in accordance with at least one embodiment of the present invention. The service discovery proxy registration request 102 indicates that either the proxy registration request 102 or a following message from the proxy client A1, includes information on services to be subscribed or published by the proxy server A2 for the proxy client A1.

Figure 2A:
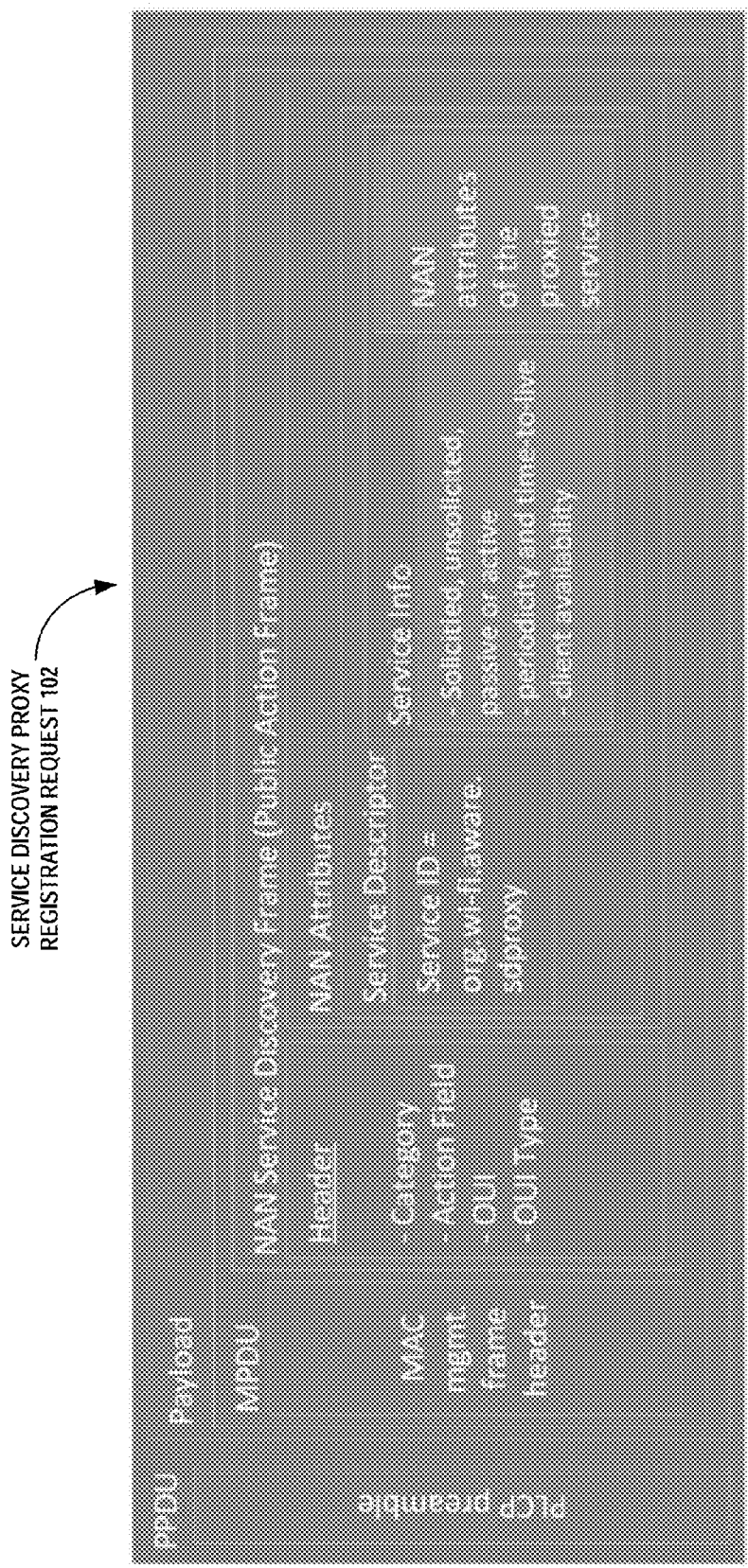
FIG. 2A shows an example format of the service discovery proxy registration request transmitted by the proxy client, in accordance with at least one embodiment of the present invention.

FIG. 2A shows an example format of the service discovery proxy registration request 102 transmitted by the proxy client A1, in accordance with at least one embodiment of the present invention.

The request 102 should in general contain all the same information a service/application layer provides to the NAN discovery engine in a device when requesting publish/subscribe to be activated. In this case a proxy client forms a follow-up message that contains the following information in the Service Info field and transmits it to the selected proxy server device to request publish/subscribe session registration:

a) Indication of whether the request applies to a service publish or to a service subscribe b) Service ID (or corresponding service name) (mandatory)

c) Matching_filter_tx (optional)

May contain further conditions beyond the Service ID that are transmitted in publish/subscribe messages from the proxy server on the proxied service publish/subscribe d) Matching_filter_rx (optional)

May be used to set additional conditions for triggered publish/subscribe message transmission in a proxy server beyond the Service ID e) Service_specific_info (optional)

May contain service specific information that the proxy server transmits in publish/subscribe messages on the proxy service publish/subscribe f) Configuration parameters of the proxied service publish (mandatory when request is on publish, otherwise not present)

Publish type: unsolicited transmissions only, solicited transmissions only, or both unsolicited and solicited transmissions Solicited transmission type: Whether the solicited transmissions are unicast or multicast Announcement period: Recommended periodicity of unsolicited transmissions Time to live: Indicates how long the proxied publish is requested to be valid and active in the proxy server.

g) Configuration parameters of the proxied service subscribe (mandatory when request is on subscribe, otherwise not present)

Subscribe type: active or passive

Query period: Recommended periodicity of subscribe message transmissions

Time to live: Indicates how long the proxied subscribe is requested to be valid and active in the proxy server.

h) Information about availability of the proxy client (mandatory)

Indicates when the proxy client device will be available e.g. for direct NAN service discovery. This can be indicated as a NAN discovery window number, as a reference to the last or next NAN discovery window or as a reference to the synchronization timer value that is used in the present NAN cluster. Can be also set to a value that indicates "unknown availability" with which the proxy client indicates, as an example, that it is not available for any subsequent NAN service discoveries in any of the NAN DWs.

i) Information gathering state (mandatory)

Indicates whether the proxy server is requested to gather and store information on detected subscribes/publishes that match the proxied publish/subscribe. Set to '1' to request the proxy server to gather the information and set '0' when the proxy server doesn't have to gather/store any of the information but it's enough to transmit publish/subscribe messages on behalf of the proxy client. Another option is to declare another FAV window to indicate when the client is available.

FIG. 2 illustrates an example design in which selected information is carried in NAN attributes. As an example, one could use the Service Descriptor attribute to carry information on proxied service publish/subscribe. A Service Descriptor attribute could be used, as an example, to indicate the Service ID, the matching filters and service info. Additionally, one could include some other NAN attributes like NAN connection capability attribute, P2P operation attribute, and NAN data link attribute to indicate the proxy client availability outside the NAN discovery windows.

Alternatively, registration process may comprise of two phases with their own session management messages: a) session setup, b) information update. When such a design is applied, in the first phase a proxy client simply sets up a proxy session without giving any of the proxied service publish/subscribe information. During the information update phase the proxy client provides to the proxy server up to date information on the proxied service publish/subscribe. The proxy client may update the information at any time while the session is valid and alive, and multiple respective session management messages may be transmitted to the proxy server.

Upon receiving a Service Discovery Proxy Registration Request message, a NAN2 proxy server makes a decision on whether to accept it or not. The decision is signaled back with a Service Discovery Proxy Registration Response message. The request may also be acknowledged with a MAC ACK.

FIG. 3 illustrates the example network diagram of FIG. 1, wherein the proxy server A2 has received the service discovery proxy registration request 102 from the proxy client A1. The figure shows the proxy server A2 transmitting to the proxy client A1, a service discovery proxy registration response 103, in response to the receiving of the service discovery proxy registration request 102, in accordance with at least one embodiment of the present invention.

Figure 3A:
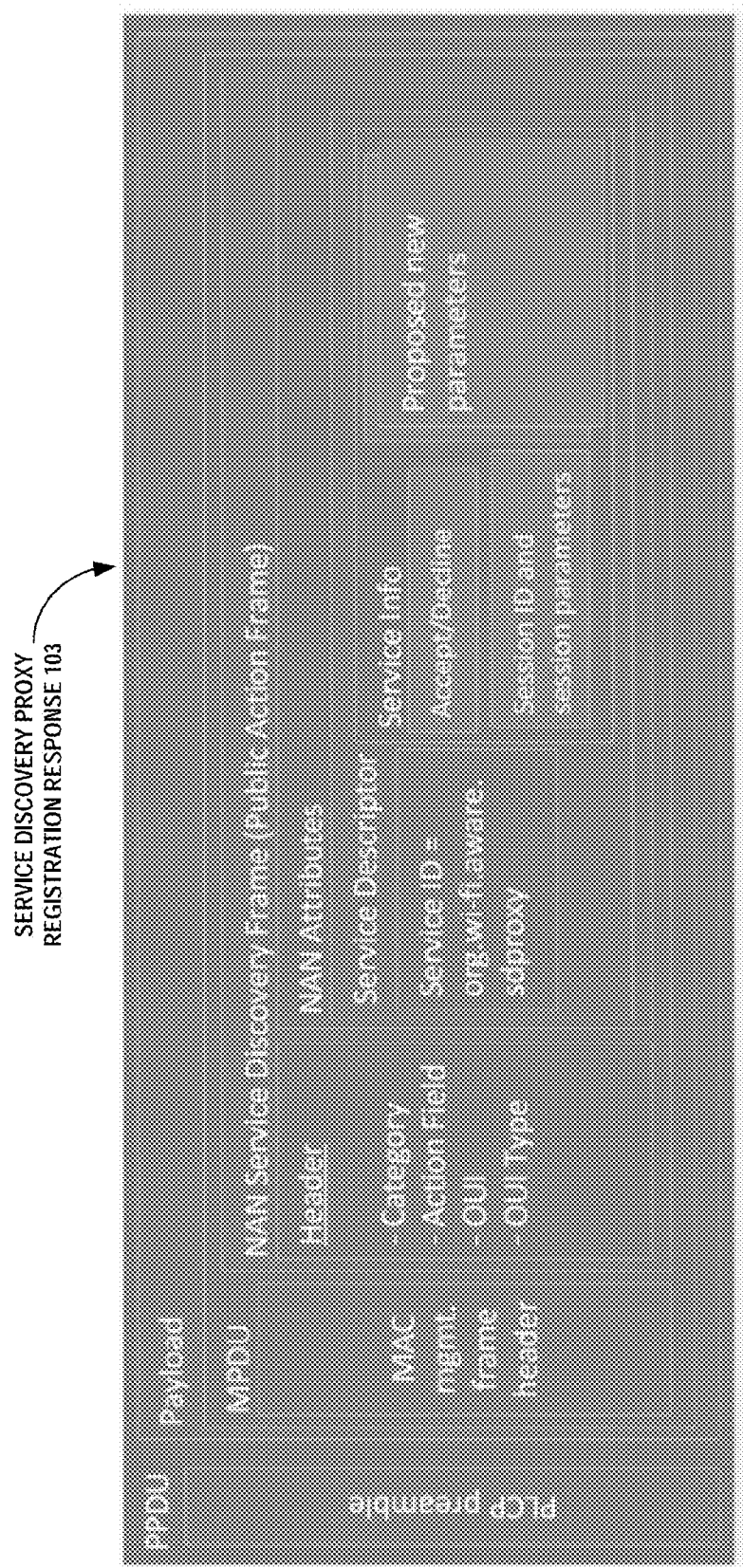
FIG. 3A shows an example format of the service discovery proxy registration response transmitted by the proxy server, in accordance with at least one embodiment of the present invention.

FIG. 3A shows an example format of the service discovery proxy registration response 103 transmitted by the proxy server A2, in accordance with at least one embodiment of the present invention.

The Service Discovery Proxy Registration Response message includes the following information:

a) Decision (accept/reject) (mandatory)

b) In case of rejection, the message may include the reason and proposed new set of parameters. (optional)

As an example, the proxy server may be forced to reject the request because the requested announcement/query period or the time to live is not acceptable. The server may use these fields to give guidance to the proxy client on parameter values with which a request could be acceptable.

c) Session identifier (mandatory if session accepted)

Proxy server specific unique identifier for the proxied service publish/subscribe session. To be used throughout the lifetime of the session in all the session management messages.

d) Session maintenance parameters (mandatory)

Keep alive message period

Indicates how often the proxy client needs to be in contact with the proxy server to maintain the session alive. More on this topic below where the session maintenance is described in more details.

Information gathering period

Indicates how often the proxy server expects the proxy client to be available for possible information about the session. More on this topic below where the session maintenance is described in more details.

This information is valid only if the proxy server is requested to gather and store information about detected publish/subscribe messages that match the proxied subscribe/publish The response message is carried in a follow-up message that has the structure similar to the request message. An example structure of such a response message is provided in FIG. 3A.

Upon receiving a Service Discovery Proxy Registration Response frame, the NAN2 proxy client checks if the request was accepted and if yes, the requested sleep cycle may be started (section 3 below). If not, a new modified request may be sent e.g. with modified parameters if such feedback was provided by the proxy server. The request may also be acknowledged with a MAC ACK.

The proxy server A2 then commences at least one of publishing and subscribing the services indicated by the proxy registration request 102, wherein the at least one of publishing and subscribing includes an indication that the at least one of published and subscribed services is proxied on behalf of the proxy client A1.

2.2 Proxy Session Maintenance

Upon successfully registering a service publish/subscribe to a proxy server a proxy session is established and the proxy client is responsible for maintaining the session. In the session management the proxy server and the proxy client exchange specific proxy session management messages that are used to keep the session alive, to provide information the proxy server has gathered on publish/subscribe that match the proxied subscribe/publish, and to close the session gracefully.

The messages are built upon the same principles as the registration request/response messages described above. In other words, the messages are carried in NAN follow-up messages with the Service ID set to a value corresponding to the service name assigned for the NAN service discovery proxy service and the Service Info field containing all the session management specific information starting with the message header indicating, as an example, the message type. In this phase the messages contain always the session identifier that the proxy server allocated to the session and provide in the response message described above.

2.2.1 Session Keep Alive

A proxy client needs to be available for successful message exchange with the proxy client to maintain the session alive. The proxy client needs to complete a successful session management protocol message exchange at least once per the keep alive message period indicated by the proxy server. The design may require time between two successive successful message exchanges to be less than the keep alive message period. The design may allow either the proxy client or the proxy server to send a keep alive message or the initiator role may be specified to be in one device only, e.g. in the proxy server.

The session keep alive message doesn't need to contain any other information in the Service Info field but just the session identifier.

If the proxy client fails to successfully exchange session management messages in time with the proxy server, the session is deemed terminated and the session expires without any further signaling.

2.2.2 Session Information

Proxy session management may provide means for a proxy client to obtain and receive information on its proxy sessions. The proxy server may, as an example, provide results of proxied service subscribe. The proxy server may indicate for each proxied service subscribe/publish how many service publishes/subscribes that match with the service subscribe/publish have been detected and any detailed information on them. Any of this type of information may be valuable especially in case of proxied service subscribe e.g. to determine whether to perform direct NAN service discovery and possibly with which device and at what time. In case of proxied service publish the information may be used on the other hand to activate normal NAN publish or to adjust parameters of an existing normal NAN publish instance.

In the preferred approach this signaling happens between the proxy server and the proxy client outside the NAN DWs during the time periods outside the DWs that the proxy server has allocated for any of the proxy management signaling, and the messages build upon the principles described earlier (i.e. follow-up message based protocol messages in which most of the message content is carried in the Service Info field).

Regardless of the message structure, a proxy server may request the proxy client to obtain the latest information at least once per the status/performance period that the server indicated in the Service Discovery Proxy Registration Response message. A proxy client may request such information by transmitting a Service Discovery Proxy Status Request message. The request message doesn't have to contain any other information but the message type in the message header and the session identifier. A response message (e.g. Service Discovery Proxy Status Response) that may be transmitted by the proxy client either on request or autonomously to the proxy client should contain the following information in the Service Info field:

a) Number of detected matching publishes/subscribes

Indicates how many publishes/subscribes that meet the proxied service subscribe/publish conditions have been detected since the previous status report b) Information on the detected matching publish/subscribe Interface address used in the detected publish/subscribe Service information available in the detected publish/subscribe An alternative approach is to have the proxy server to store all the publish/subscribe messages that it detects and that match the proxied service subscribe/publish and provide those messages to the proxy client whenever the proxy client is available. The proxy server may use one of the Proxied Publish or Proxied Subscribe messages specified in the next section to transmit the publish/subscribe messages it has stored. In such a case the Proxied Publish/Subscribe message needs to contain source address of the 3$^{rd}$ device instead of the proxy client device and no information on proxy client availability is carried in the message.

3) Proxied Service Publish and Subscribe from a Proxy Server

During a proxy session, the NAN2 proxy server acts on behalf of the NAN2 proxy client, based on the NAN2 proxy client availability cycle and based on the other information from the proxy client in the registration. In the DWs, during which the proxy client is available, the NAN2 proxy server should not act as a NAN2 proxy server for the proxy client, except in case a proxy were to be used as a range extender (which is not a primary purpose of a NAN2 proxy).

New type of signaling is needed for NAN service discovery messages that a proxy server sends on behalf of a proxy client for proxied publish/subscribe. Let's call them Proxied Publish and Proxied Subscribe messages. These messages are preferably such that legacy NAN devices (Wi-Fi Aware Release 1/NAN Release 1 devices) do not interpret them as normal NAN publish or subscribe messages. Legacy NAN devices may assume that a publish/subscribe message transmitted by a NAN device relates to the service indicated by the Service ID in the message and available in the NAN device. Thus it may, as an example, proceed directly to follow-up messaging with the NAN device using the address in the transmit address field of the received publish/subscribe message. But if the message is from a proxy server, this is not possible but the publish/subscribe message related to a proxied service publish/subscribe needs to be understood to origin from another device, not from the proxy server.

The preferred approach is to define a new NAN service discovery message type in addition to publish, subscribe and follow-up messages. The Service Control field within the Service Descriptor attribute contains a two bit field that currently is used to indicate whether the attribute carries publish, subscribe or follow-up message. Fourth value ('11') is reserved and in the preferred design it is used to indicate Proxied message type. Whenever a legacy NAN device receives such an attribute it discards the attribute and its content but a NAN2 device (Wi-Fi Aware Release 2 device) would interpret that as an indication of proxied publish/subscribe message. A proxied message would need also some new information fields like:

a) Message type

One octet field, as an example, that indicates whether the proxied message is of publish ('0') or subscribe ('1') type b) Interface address of the NAN2 proxy client Six octet field that indicates the MAC address of the proxy client c) Availability information of the NAN2 proxy client Two octet field, as an example, that indicates the NAN DW during which the proxy client related to the proxied publish/subscribe is available. In the preferred design the field indicates the number of DWs before the DW before the proxy client is available. Alternatively the field or a FAV may be used to indicate the DW during which the proxy client is available as an absolute TSF value.

A field that is present if the NAN2 proxy client is available in another NAN cluster than in which the proxied message is transmitted and that indicates in which NAN cluster the client operates.

Figures 4A, 4B:
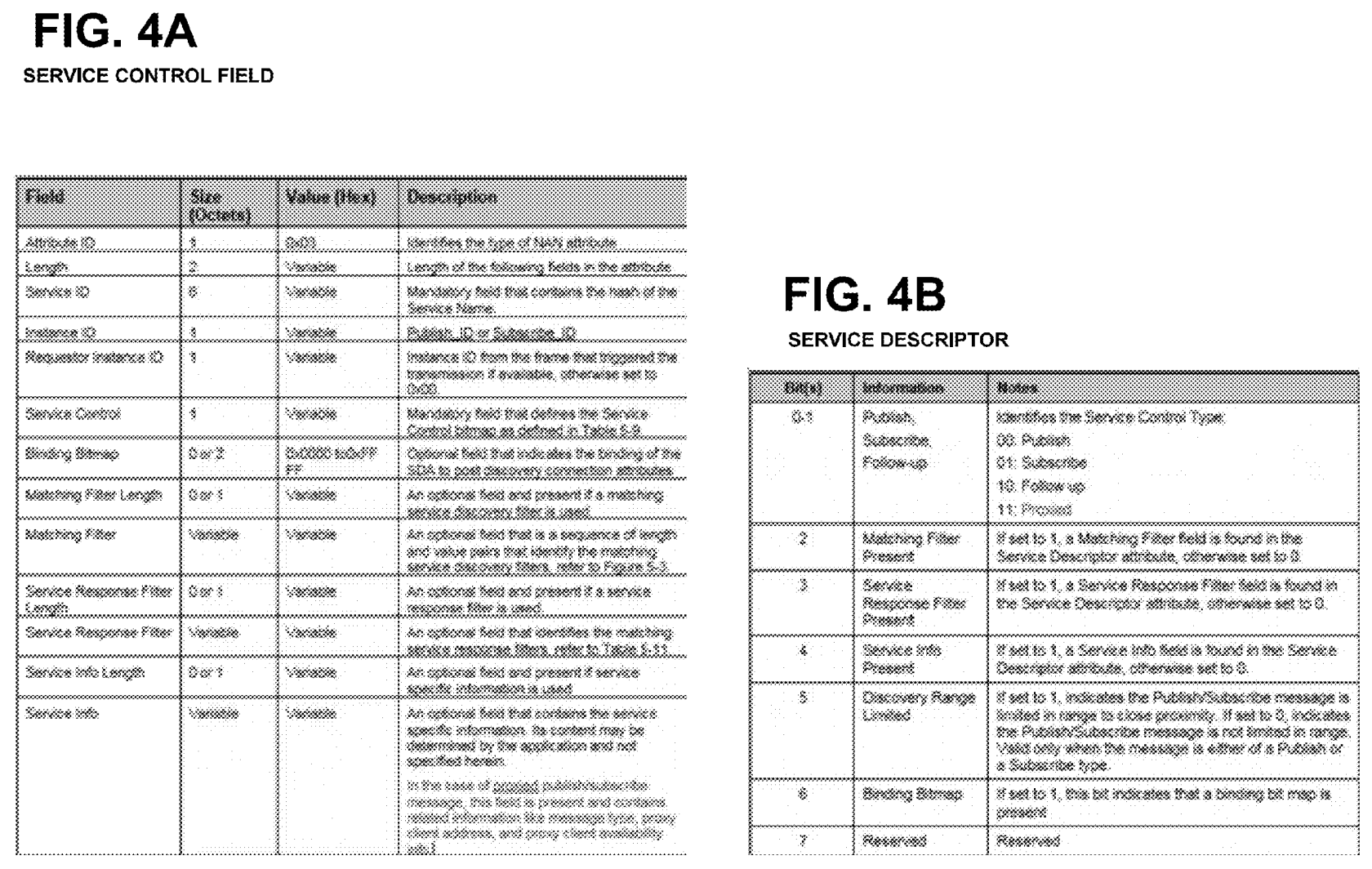

FIG. 4A shows an example format of a modified service control field in the NAN service discovery message, with the proxied publish and subscribe implemented, in accordance with at least one embodiment of the present invention.

FIG. 4B shows an example format of proxy specific fields in the Service Info field of a Service Descriptor attribute in the NAN service discovery message, in accordance with at least one embodiment of the present invention.

FIGS. 4A and 4B show modifications to the Service Descriptor attribute (left) and to the Service Control field (right) carried in the updated Service Descriptor attribute. With this approach both the Proxied Publish and the Proxied Subscribe message would be entirely new type of messages that would be carried in NAN SDFs with the Service Control Field within the Service Descriptor attribute set to indicate the new message type and the Service Info field within the same Service Descriptor attribute containing information elements/fields that carry details of the proxied service subscribe/publish which can't be transmitted in the other fields of the attribute.

FIG. 5 shows an example format of a new NAN Service Discovery Proxy attribute in the NAN service discovery message, in accordance with at least one embodiment of the present invention. This embodiment leaves the Service Descriptor attribute and the Service Control Field within it untouched and define a new attribute for proxy related signaling. A new attribute (e.g. Service Discovery Proxy attribute) would need to contain the proxy client interface address and information about the proxy client availability. Example format of such a new attribute is as shown in FIG. 5. With this approach both the Proxied Publish and the Proxied Subscribe message would be extended legacy publish and subscribe messages respectively. They both would be carried in NAN SDFs with the Service Control Field within the Service Descriptor attribute set to indicate either publish or subscribe message type as applicable and a new attribute like the NAN Service Discovery Proxy attribute to carry detailed information about the proxied service publish/subscribe.

When this approach is used also the legacy NAN devices may receive the proxied information, except the information in the new attribute. Therefore legacy devices may get awareness on existence of certain proxied service, through the NAN2 proxy server, but they may not be able to perform follow-up signaling without conducting NAN service discovery first.

4) Example Signaling Diagrams

Example signaling diagrams are presented below in the following four figures. Each of these present a case where proxy client first registers to the server a service publish or a service subscribe and then goes to doze/absent. During the absence, a $3^{rd}$ device conducts NAN service discovery on the corresponding service and it is responsibility of the proxy server to deal the case so that the proxy client and any $3^{rd}$ device have possibility to e.g. perform follow-up once the proxy client comes back from the absence.

Notes: A) All the signaling between the proxy client and the proxy server shown in the figures happen outside the NAN DWs during time periods allocated by the proxy server for the proxy management communication. B) All the signaling between the proxy server and the $3^{rd}$ device illustrated in the figures is to happen during the NAN DWs.

FIG. 6 shows an example signal sequence diagram for a proxied solicited publish, in accordance with at least one embodiment of the present invention. First, a proxy client asks a proxy server that it has earlier detected to be available to perform solicited publish by issuing a proxy registration request. Upon receiving a positive acknowledgement from the proxy server the proxy client may enter into the doze state for some NAN DWs while the proxy server publishes on the client's behalf. Upon receiving a subscribe message 104 that meets the trigger conditions set to the proxied publish, the proxy server transmits a Proxied Publish 105. The Proxy Server should not be triggered by a subscribe message from a legacy NAN device but the Proxied Publish message should be triggered only upon reception of a subscribe message from a NAN2 device.

If the proxy session involves information gathering, the proxy server stores at least selected information related to the subscribe message that triggered transmission of the Proxied Publish message. In one implementation the proxy server may store the whole subscribe message that it later on transmits to the proxy client. The diagram closes with the proxy client obtaining session information from the proxy server. In the diagram the proxy client requests the information 106 and the proxy server replies with a message 107 that contains the requested information. The reply message may be, as an example, of the format used with the Proxied Subscribe message specified earlier. Alternatively, it may of a follow-up message format that contains the required information in the Service Info field.

Figure 7:
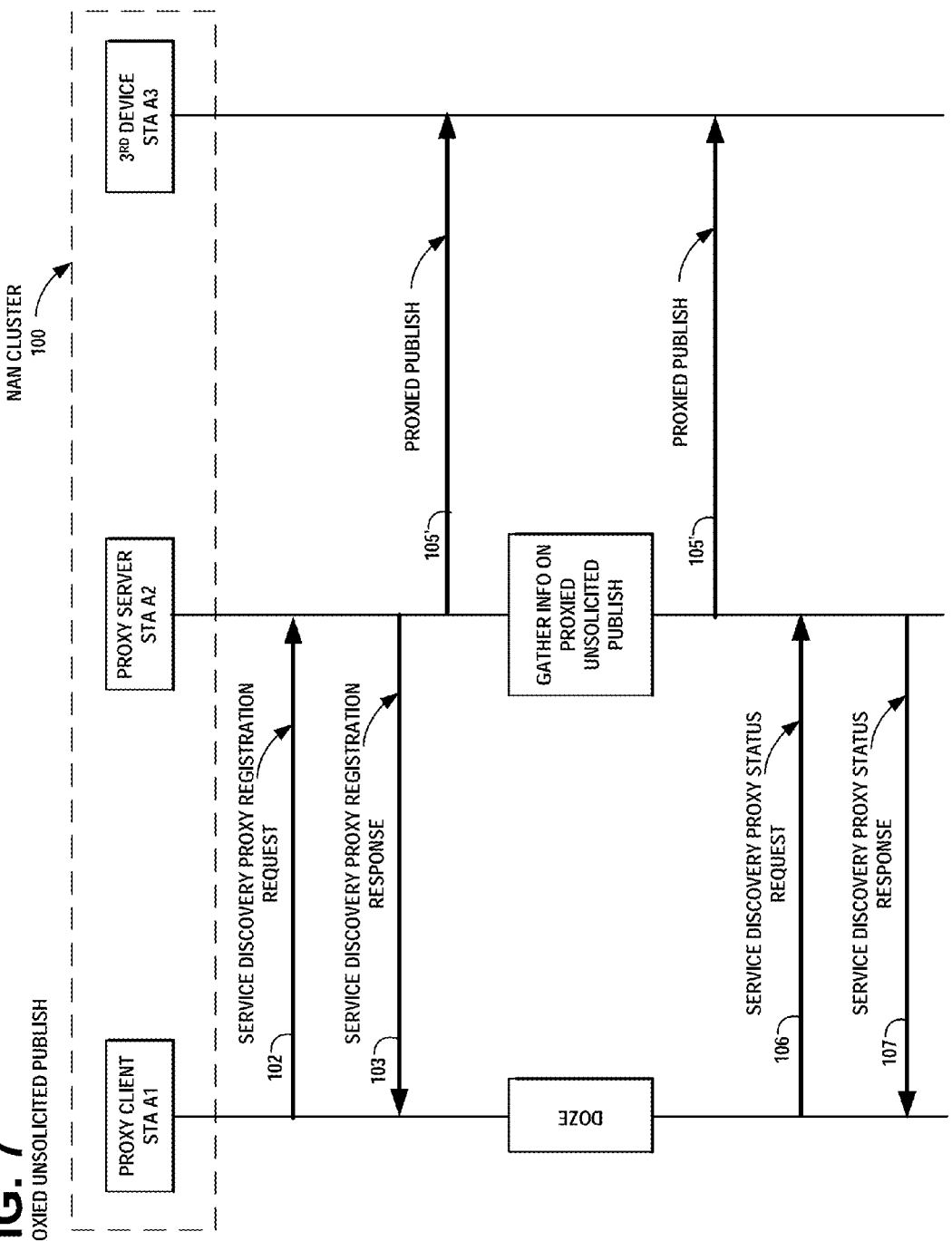
FIG. 7 shows an example signal sequence diagram for a proxied unsolicited publish, in accordance with at least one embodiment of the present invention.

FIG. 7 shows an example signal sequence diagram for a proxied unsolicited publish 105', in accordance with at least one embodiment of the present invention. Once the proxy client has successfully registered an unsolicited publish session with a proxy server, the proxy server starts publishing per the request. It may also gather information on the session as requested (e.g. number of detected $3^{rd}$ devices that subscribe on the published service and content of the related subscribed messages received). The diagram closes with the proxy client obtaining session information from the proxy server with the means similar discussed above on FIG. 6.

Figure 8:
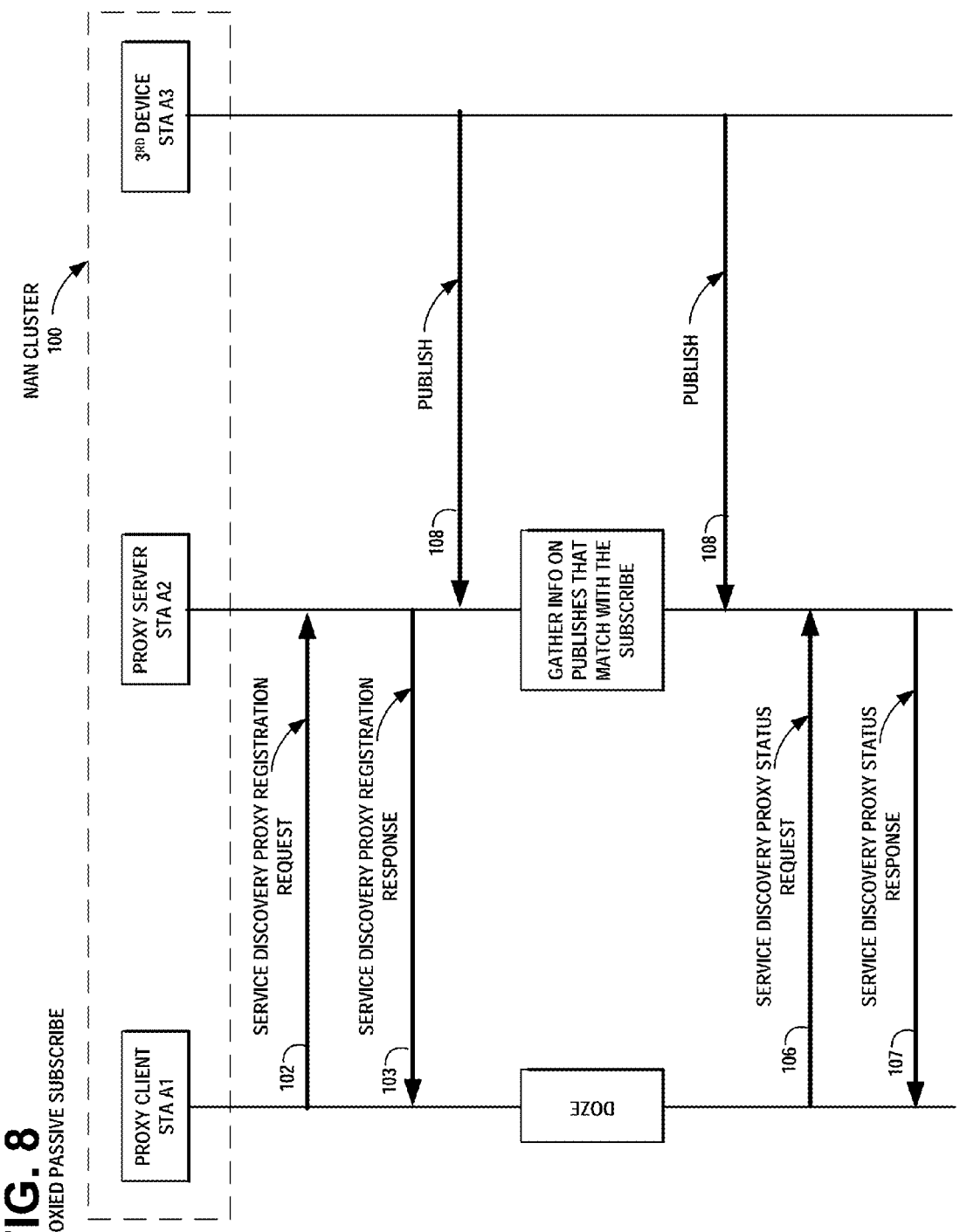
FIG. 8 shows an example signal sequence diagram for a proxied passive subscribe, in accordance with at least one embodiment of the present invention.

FIG. 8 illustrates an example case of proxied passive subscribe. In this case the proxy server needs to gather information on publishes 108 that match with the registered subscribe and the proxy client is expected to get that information from the proxy server for any further actions.

Figure 9:
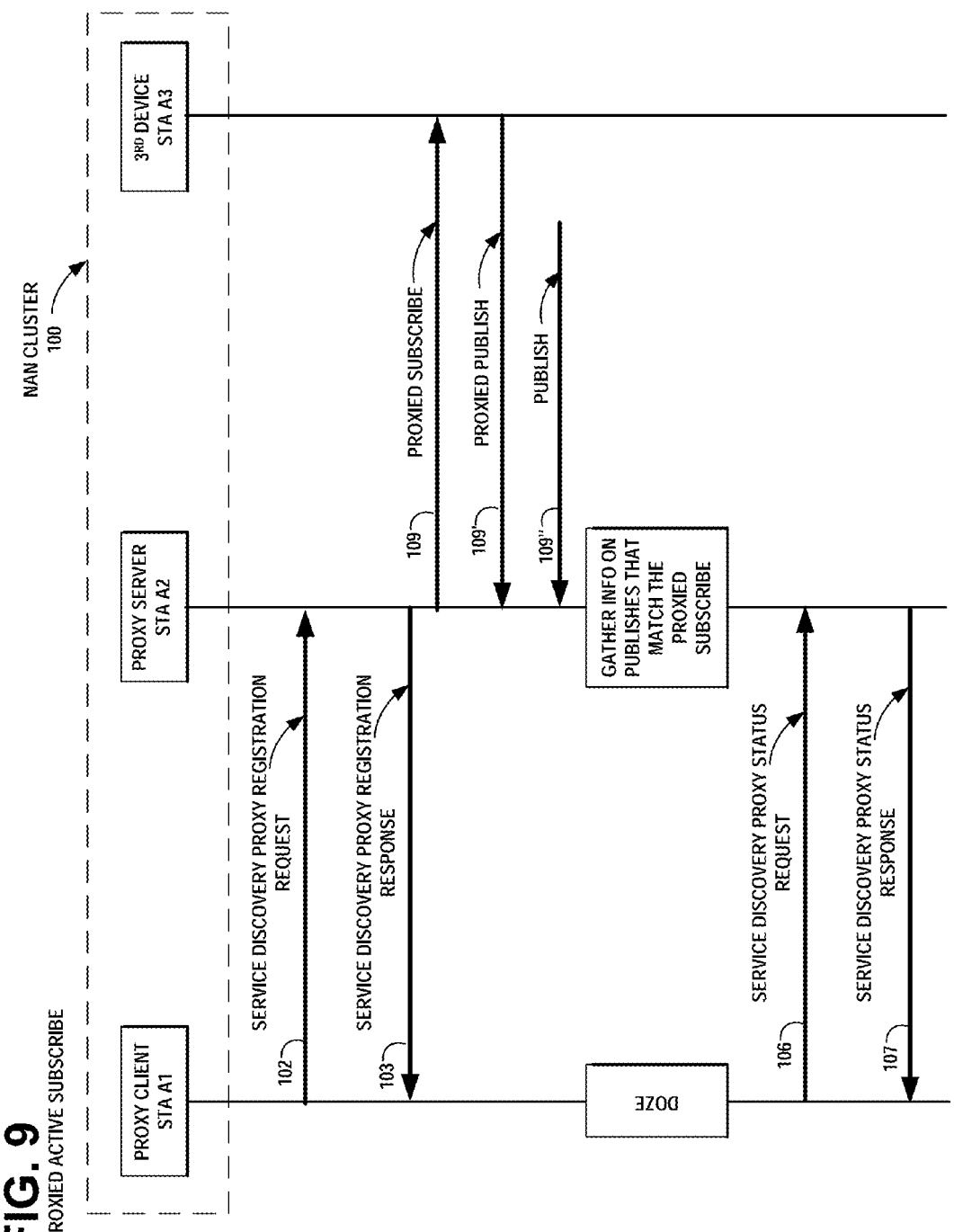
FIG. 9 shows an example signal sequence diagram for a proxied active subscribe, in accordance with at least one embodiment of the present invention.

FIG. 9 illustrates an example case of proxied active subscribe. In this case the proxy server transmits Proxied Subscribe messages 109 to trigger transmission of Proxied Publish messages 109' from NAN2 capable $3^{rd}$ devices. The proxy server may need to gather information 109" about detected publishes that match the registered subscribe. The proxy server should consider both the legacy publish messages and the Proxied Publish messages and provide information to the proxy client on them as required.

Figure 10:
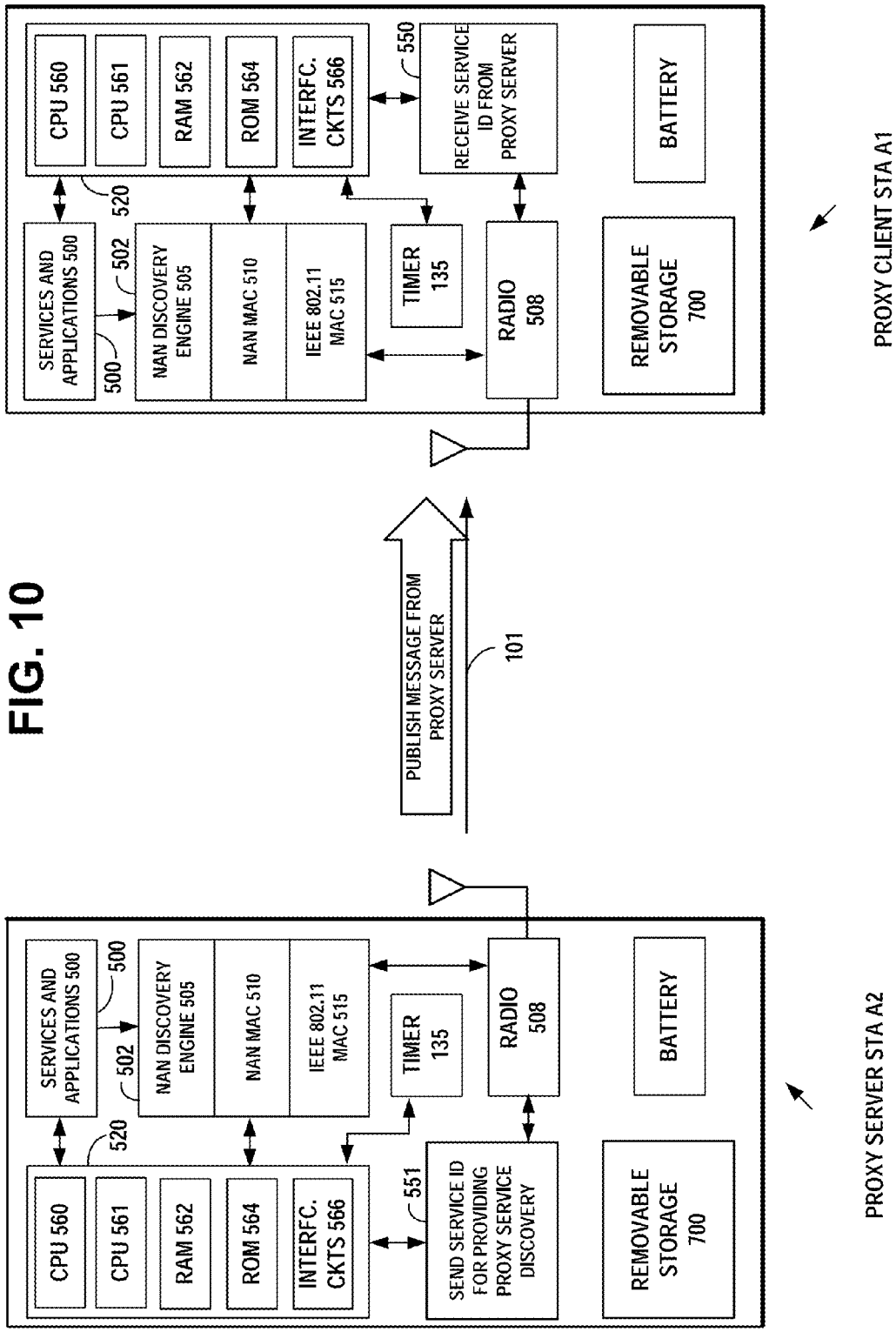
FIG. 10 illustrates an example network diagram of the proxy server and the proxy client. The proxy server is shown transmitting a wireless service discovery frame and the proxy client receiving the service discovery frame including the composed service ID, in accordance with at least one embodiment of the present invention.

FIG. 10 illustrates an example network diagram of the proxy server A2 and the proxy client A1, which are operating in a neighbor awareness network cluster 100. The proxy server A2 is shown transmitting a wireless service discovery frame 101 and the proxy client A1 receiving the service discovery frame including the composed service ID, in accordance with at least one embodiment of the present invention.

In an example embodiment of the invention, the proxy server A2 and the proxy client A1 may include a processor 520 that includes a single core or multi-core central processing unit (CPU) 560 and 561, a random access memory (RAM) 562, a read only memory (ROM) 564, and interface circuits 566 to interface with the radio transceiver 508. The proxy server A2 and the proxy client A1 may each further include a battery and other power sources, key pad, touch screen, display, microphone, speakers, ear pieces, camera or other imaging devices, etc. The RAM 562 and ROM 564 may be removable memory devices 700 shown in FIG. 12, such as smart cards, SIMs, WIMs, semiconductor memories such as RAM, ROM, PROMS, flash memory devices, etc. according to an embodiment of the present invention. According to an example embodiment of the invention, the proxy server A2 and the proxy client A1, each include the awareness protocol stack 502.

In an example embodiment of the invention, the awareness protocol stack 502 may include the NAN discovery engine 505 and the NAN MAC 510. In an example embodiment of the invention, the awareness protocol stack 502 may include an Awareness Layer, Community Layer, Network Layer, and Link Layer. In an example embodiment of the invention, the awareness protocol stack 502 may include the IEEE 802.11 protocol stack 515.

Figure 12:
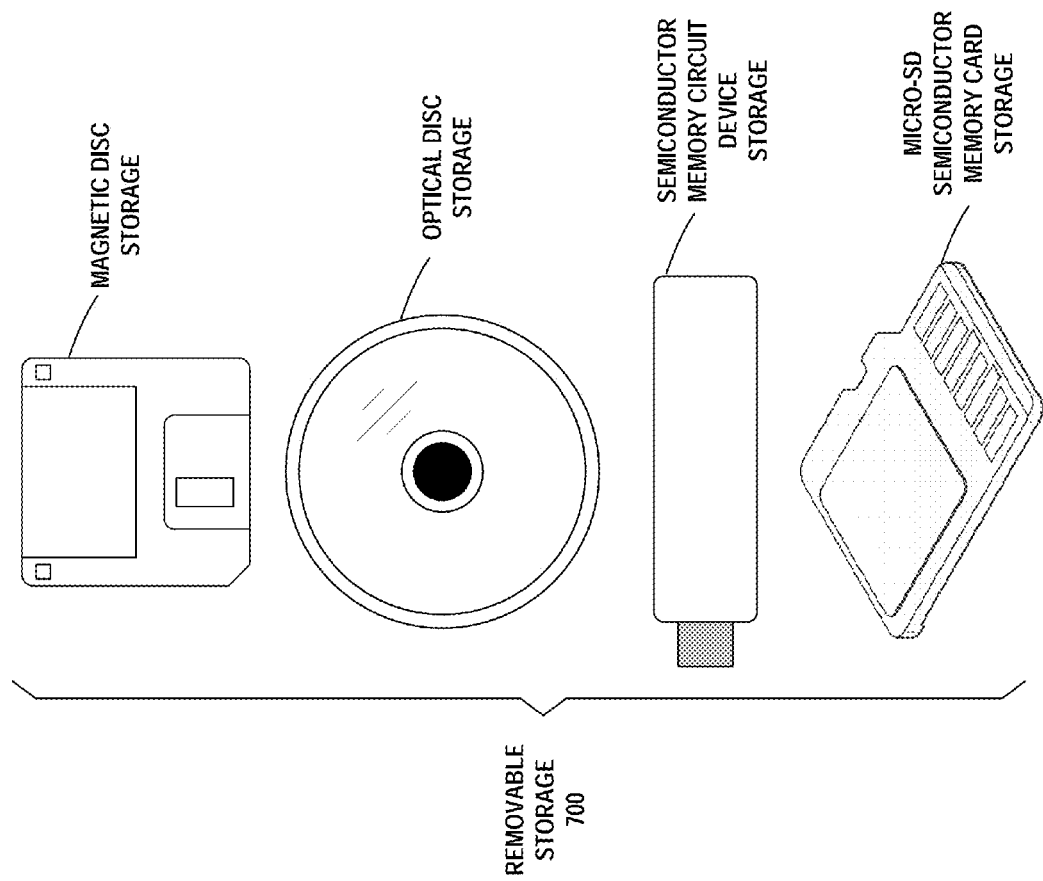
FIG. 12 illustrates an example embodiment of the invention, wherein examples of removable storage media are shown, based on magnetic, electronic and/or optical technologies, such as magnetic disks, optical disks, semiconductor memory circuit devices and micro-SD memory cards (SD refers to the Secure Digital standard) for storing data and/or computer program code as an example computer program product, in accordance with an example embodiment of the invention.

In an example embodiment of the invention, the processor 520, protocol stack 502 and/or application program 500 may be embodied as program logic stored in the RAM 562 and/or ROM 564 in the form of sequences of programmed instructions which, when executed in the CPUs 560 and/or 561, carry out the functions of the disclosed embodiments. The program logic may be delivered to the writeable RAM, PROMS, flash memory devices, etc. 562 of the proxy server A2 and the proxy client A1 from a computer program product or article of manufacture in the form of computer-usable media such as resident memory devices, smart cards or other removable memory devices, as illustrated in FIG. 12. Alternately, they may be embodied as integrated circuit logic in the form of programmed logic arrays or custom designed application specific integrated circuits (ASIC). The radio 508 in the each of the proxy server A2 and the proxy client A1 may be separate transceiver circuits or alternately, the radio 508 may be a single radio module capable of handling one or multiple channels in a high speed, time and frequency multiplexed manner in response to the processor 520. The program code for instructing the apparatus to perform its various operations may be stored in computer readable media, for example magnetic disks, CD ROMS, or flash memory devices. The program code may be downloaded from such computer readable media to be stored for example in the RAM 562 or programmable ROM 564 of the proxy server A2 and the proxy client A1 for execution of the program code for example by the CPUs 560 and/or 561. Removable storage media 700 are shown in FIG. 12.

FIG. 11A is an example flow diagram 600 of operational steps in proxy server A2, in accordance with at least one embodiment of the present invention. The steps of the flow diagram represent computer code instructions stored in the RAM and/or ROM memory, which when executed by the central processing units (CPU), carry out the functions of the example embodiments of the invention. The steps may be carried out in another order than shown and individual steps may be combined or separated into component steps. The flow diagram has the following steps:

Step 602: composing, by a wireless device in a wireless network, a service ID indicating support for providing proxy service discovery for other wireless devices operating in the wireless network; and Step 604: transmitting, by the wireless device, a wireless service discovery frame to the wireless network, the service discovery frame including the composed service ID.

FIG. 11B is an example flow diagram 650 of operational steps in proxy client A1, in accordance with at least one embodiment of the present invention. The steps of the flow diagram represent computer code instructions stored in the RAM and/or ROM memory, which when executed by the central processing units (CPU), carry out the functions of the example embodiments of the invention. The steps may be carried out in another order than shown and individual steps may be combined or separated into component steps. The flow diagram has the following steps:

Step 652: receiving, by a wireless device in a wireless network, a wireless service discovery frame from another wireless device operating in the wireless network, the service discovery frame including a service ID indicating support by the other wireless device for providing proxy service discovery for wireless devices operating in the wireless network;

Step 654: transmitting, by the wireless device, to the other wireless device, a proxy registration request message in response to the wireless service discovery frame; and Step 656: receiving, by the wireless device, a response message in response to the proxy registration request message, indicating registration of the wireless device by the other wireless device, to provide a proxy service for the wireless device.

FIG. 11C is an example flow diagram 670 of operational steps in the proxy server commencing at least one of publishing and subscribing the services indicated by the proxy registration request, in accordance with at least one embodiment of the present invention. The steps of the flow diagram represent computer code instructions stored in the RAM and/or ROM memory, which when executed by the central processing units (CPU), carry out the functions of the example embodiments of the invention. The steps may be carried out in another order than shown and individual steps may be combined or separated into component steps. The flow diagram has the following steps:

Step 672: composing, by a wireless device in a wireless network, a service ID indicating support for providing proxy service discovery for other wireless devices operating in the wireless network;

Step 674: transmitting, by the wireless device, a wireless service discovery frame to the wireless network, the service discovery frame including the composed service ID;

Step 676: receiving, by the wireless device, from at least one of the other wireless devices operating in the wireless network, a request message in response to the transmitting of the wireless service discovery frame, the request message being a proxy registration request indicating that either the proxy registration request or a following message from the at least one of the other wireless devices operating in the wireless network, includes information on services to be subscribed or published by the wireless device for the at least one of the other wireless devices;

Step 678: registering, by the wireless device, the at least one of the other wireless devices operating in the wireless network, to provide a proxy service for the at least one of the other wireless devices;

Step 680: transmitting, by the wireless device, to the at least one of the other wireless devices operating in the wireless network, a response message in response to the receiving of the request message; and Step 682: commencing, by the wireless device, at least one of publishing and subscribing the services indicated by the proxy registration request, wherein the at least one of publishing and subscribing includes an indication that the at least one of published and subscribed services is proxied on behalf of the at least one of the other wireless devices operating in the wireless network.

Figure 11D:
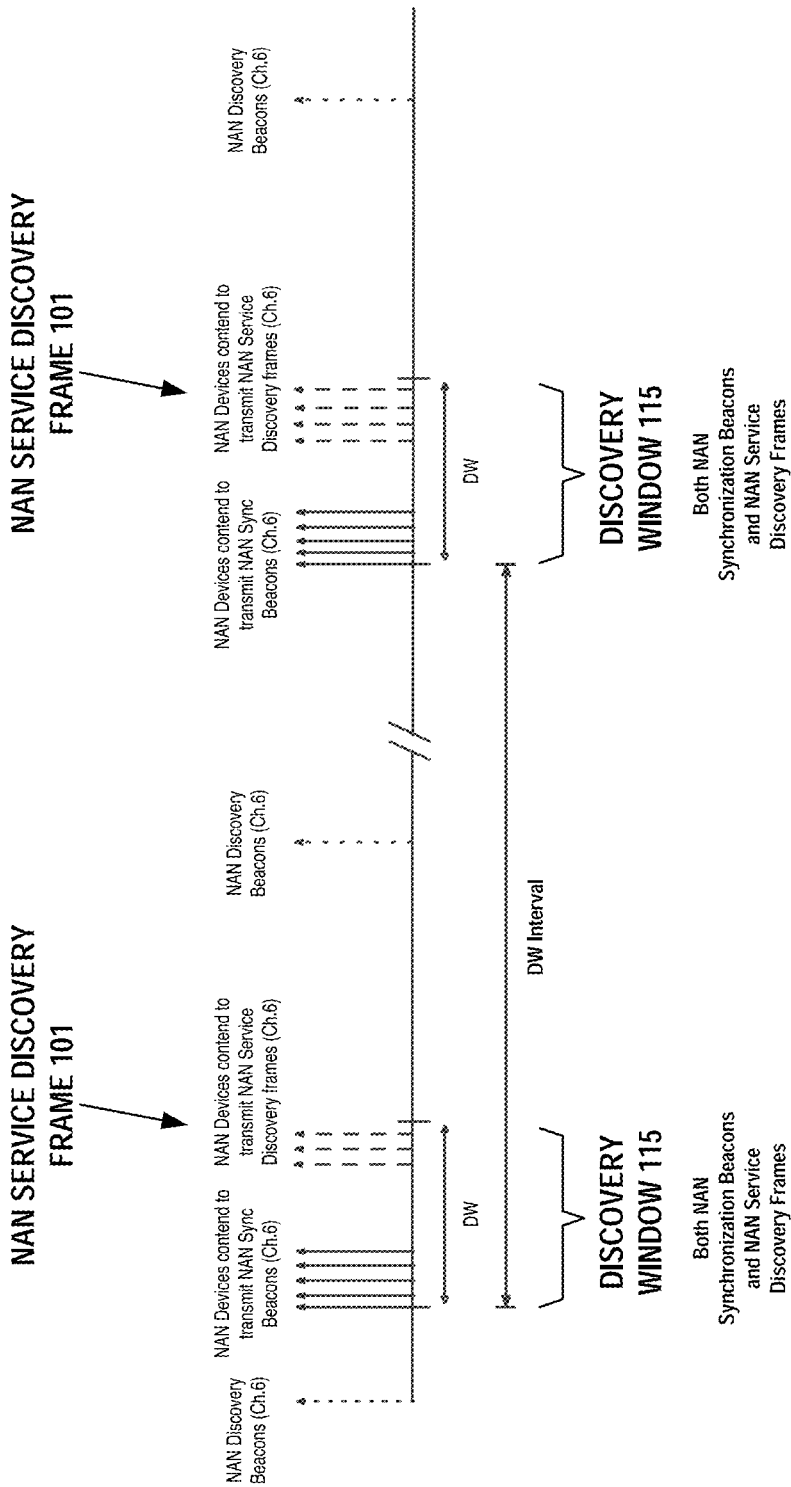
FIG. 11D illustrates an example Discovery Window in 2.4 GHz, within which is transmitted the NAN Service Discovery frame, in accordance with an example embodiment of the invention.

FIG. 11D illustrates an example Discovery Window 115 in 2.4 GHz, within which is transmitted the NAN Service Discovery frame 101, in accordance with an example embodiment of the invention.

During a discovery window 115, one or more NAN Devices transmit a NAN Service Discovery frame 101, which is a Vendor Specific Public Action frame. The NAN Service Discovery Frame 101 is an IEEE 802.11 management frame, transmitted by a NAN device in a NAN cluster. NAN Service Discovery frames 101 enable NAN Devices to look for services from other NAN Devices and make services discoverable for other NAN Devices. There are three NAN Service Discovery protocol messages defined in the NAN Service Discovery Protocol:

1. Publish message
2. Subscribe message
3. Follow-up message

The NAN Service Discovery protocol messages are carried in Service Descriptor attributes that are carried in the NAN Service Discovery frames 101. A NAN Device may use a NAN Service Discovery frame 101 to actively look for availability of a specific service. When a NAN Device uses a Subscribe message, it asks for other NAN Devices operating in the same NAN Cluster to transmit a Publish message when response criteria are met. A NAN Device may use a Publish message to make its service discoverable for other NAN Devices operating in the same NAN Cluster in an unsolicited manner. The Service Control field indicates if the Service Descriptor attribute corresponds to Publish, Subscribe, or Follow-up function and if other optional fields are present in the Service Descriptor attribute such as Matching Filter, Service Response Filter, and Service specific information.

FIG. 12 illustrates an example embodiment of the invention, wherein examples of removable storage media 700 are shown, based on magnetic, electronic and/or optical technologies, such as magnetic disks, optical disks, semiconductor memory circuit devices and micro-SD memory cards (SD refers to the Secure Digital standard) for storing data and/or computer program code as an example computer program product, in accordance with an example embodiment of the invention.

Embodiments of the invention provide power savings for NAN2 devices that may use proxy servers for publish/subscribe:

a) The low power device does not need to awake for NAN service discovery as often as if there would be no proxy server available b) The discovery of available services is faster for the low power devices, i.e. the services are discovered with less effort because one is expected to receive required information from a proxy server without need to wait for information from individual devices.

Embodiments of the invention provide new functionality to advertise and discover services and/or distribute application information.

Although specific example embodiments have been disclosed, a person skilled in the art will understand that changes can be made to the specific example embodiments without departing from the spirit and scope of the invention.

What is claimed is:

1. A method comprising:
   composing, by a wireless device in a wireless network, a wireless service discovery frame, the wireless service discovery frame including at least a service ID indicating support for providing proxy service discovery for other wireless devices operating in the wireless network and one or more indications whether the proxy service discovery is available for proxied publish services, proxied subscribe services, or both; and
   transmitting, by the wireless device, the composed wireless service discovery frame to the wireless network.

2. The method of claim 1, wherein the service discovery frame includes a publish message indicating availability of proxy service discovery that includes the composed service ID.

3. The method of claim 1, further comprising:
   receiving, by the wireless device, from at least one of the other wireless devices operating in the wireless network, a proxy registration request message in response to the transmitting of the wireless service discovery frame;
   registering, by the wireless device, the at least one of the other wireless devices operating in the wireless network, to provide a proxy publish service for the at least one of the other wireless devices; and
   transmitting, by the wireless device, to the at least one of the other wireless devices operating in the wireless network, a response message indicating initiation of proxy operation for the at least one of the other wireless devices, in response to the receiving of the proxy registration request message.

4. The method of claim 3, wherein the proxy registration request message is for indicating that either the proxy registration request or a following message from the at least one of the other wireless devices operating in the wireless network, includes information on services to be subscribed or published by the wireless device as a proxy for the at least one of the other wireless devices.

5. The method of claim 4, further comprising:
   commencing, by the wireless device, at least one of publishing and subscribing the services indicated by the proxy registration request, wherein the at least one of publishing and subscribing includes an indication that the at least one of published and subscribed services is proxied on behalf of the at least one of the other wireless devices operating in the wireless network.

6. A method comprising:
   receiving, by a wireless device in a wireless network, a wireless service discovery frame from another wireless device operating in the wireless network, the service discovery frame including at least a service ID indicating support by the other wireless device for providing proxy service discovery for wireless devices operating in the wireless network and one or more indications whether the proxy service discovery is available for proxied publish services, proxied subscribe services, or both;
   transmitting, by the wireless device, to the other wireless device, a proxy registration request message in response to the wireless service discovery frame; and
   receiving, by the wireless device, a response message in response to the proxy registration request message, indicating registration of the wireless device by the other wireless device, to provide a proxy service for the wireless device.

7. The method of claim 6, wherein the service discovery frame includes a publish message indicating availability of proxy service discovery, which includes the service ID.

8. The method of claim 6, wherein the proxy registration request message is a proxy registration request indicating that either the proxy registration request or a following message sent by the wireless device, includes information on services to be subscribed or published by the other wireless device as a proxy on behalf of the wireless device.

9. An apparatus, comprising:
   at least one processor;
   at least one memory including computer program code;
   the at least one memory and the computer program code configured to, with the at least one processor, cause the apparatus at least to:
   compose in a wireless network, a wireless service discovery frame, the wireless service discovery frame including at least a service ID indicating support for providing proxy service discovery for other wireless devices operating in the wireless network and one or more indications whether the proxy service discovery is available for proxied publish services, proxied subscribe services, or both; and
   transmit the composed wireless service discovery frame to the wireless network.

10. The apparatus of claim 9, wherein the service discovery frame includes a publish message indicating availability of proxy service discovery that includes the composed service ID.

11. The apparatus of claim 9, further comprising:
    the at least one memory and the computer program code configured to, with the at least one processor, cause the apparatus at least to:
    receive from at least one of the other wireless devices operating in the wireless network, a proxy registration request message in response to the transmitting of the wireless service discovery frame;
    register the at least one of the other wireless devices operating in the wireless network, to provide a proxy publish service for the at least one of the other wireless devices; and
    transmit to the at least one of the other wireless devices operating in the wireless network, a response message indicating initiation of proxy operation for the at least one of the other wireless devices, in response to the receiving of the proxy registration request message.

12. The apparatus of claim 11, wherein the proxy registration request message is for indicating that either the proxy registration request or a following message from the at least one of the other wireless devices operating in the wireless network, includes information on services to be subscribed or published by the wireless device as a proxy for the at least one of the other wireless devices.

13. The apparatus of claim 12, further comprising:
the at least one memory and the computer program code configured to, with the at least one processor, cause the apparatus at least to:
commence at least one of publishing and subscribing the services indicated by the proxy registration request, wherein the at least one of publishing and subscribing includes an indication that the at least one of published and subscribed services is proxied on behalf of the at least one of the other wireless devices operating in the wireless network.

14. An apparatus, comprising:
at least one processor;
at least one memory including computer program code;
the at least one memory and the computer program code configured to, with the at least one processor, cause the apparatus at least to:
receive in a wireless network, a wireless service discovery frame from another wireless device operating in the wireless network, the service discovery frame including a service ID indicating at least support by the other wireless device for providing proxy service discovery for wireless devices operating in the wireless network and one or more indications whether the proxy service discovery is available for proxied publish services, proxied subscribe services, or both;
transmit to the other wireless device, a proxy registration request message in response to the wireless service discovery frame; and
receive a response message in response to the proxy registration request message, indicating registration of the wireless device by the other wireless device, to provide a proxy service for the wireless device.

15. The apparatus of claim 14, wherein the service discovery frame includes a publish message indicating availability of proxy service discovery, which includes the service ID.

16. The apparatus of claim 14, wherein the proxy registration request message is a proxy registration request indicating that either the proxy registration request or a following message sent by the wireless device, includes information on services to be subscribed or published by the other wireless device as a proxy on behalf of the wireless device.

17. A computer program product comprising computer executable program code recorded on a computer readable non-transitory storage medium, the computer executable program code comprising:
code for composing, by a wireless device in a wireless network, a wireless service discovery frame, the wireless service discovery frame including at least a service ID indicating support for providing proxy service discovery for other wireless devices operating in the wireless network and one or more indications whether the proxy service discovery is available for proxied publish services, proxied subscribe services, or both; and
code for transmitting, by the wireless device, the composed wireless service discovery frame to the wireless network.

18. The computer program product of claim 17, wherein the service discovery frame includes a publish message indicating availability of proxy service discovery that includes the composed service ID.

19. The computer program product of claim 17, further comprising:
code for receiving, by the wireless device, from at least one of the other wireless devices operating in the wireless network, a proxy registration request message in response to the transmitting of the wireless service discovery frame;
code for registering, by the wireless device, the at least one of the other wireless devices operating in the wireless network, to provide a proxy publish service for the at least one of the other wireless devices; and
code for transmitting, by the wireless device, to the at least one of the other wireless devices operating in the wireless network, a response message indicating initiation of proxy operation for the at least one of the other wireless devices, in response to the receiving of the proxy registration request message.

20. The computer program product of claim 19, wherein the proxy registration request message is for indicating that either the proxy registration request or a following message from the at least one of the other wireless devices operating in the wireless network, includes information on services to be subscribed or published by the wireless device as a proxy for the at least one of the other wireless devices.

21. The computer program product of claim 20, further comprising:
code for commencing, by the wireless device, at least one of publishing and subscribing the services indicated by the proxy registration request, wherein the at least one of publishing and subscribing includes an indication that the at least one of published and subscribed services is proxied on behalf of the at least one of the other wireless devices operating in the wireless network.

22. A computer program product comprising computer executable program code recorded on a computer readable non-transitory storage medium, the computer executable program code comprising:
code for receiving, by a wireless device in a wireless network, a wireless service discovery frame from another wireless device operating in the wireless network, the service discovery frame including at least a service ID indicating support by the other wireless device for providing proxy service discovery for wireless devices operating in the wireless network and one or more indications whether the proxy service discovery is available for proxied publish services, proxied subscribe services, or both;
code for transmitting, by the wireless device, to the other wireless device, a proxy registration request message in response to the wireless service discovery frame; and
code for receiving, by the wireless device, a response message in response to the proxy registration request message, indicating registration of the wireless device by the other wireless device, to provide a proxy service for the wireless device.

23. The computer program product of claim 22, wherein the service discovery frame includes a publish message indicating availability of proxy service discovery, which includes the service ID.

24. The computer program product of claim 22, wherein the proxy registration request message is a proxy registration request indicating that either the proxy registration request or a following message sent by the wireless device, includes information on services to be subscribed or published by the other wireless device as a proxy on behalf of the wireless device.

* * * * *